(12) United States Patent
Chopra et al.

(10) Patent No.: US 11,928,799 B2
(45) Date of Patent: Mar. 12, 2024

(54) ELECTRONIC DEVICE AND CONTROLLING METHOD OF ELECTRONIC DEVICE

(71) Applicant: SAMSUNG ELECTRONICS CO., LTD., Suwon-si (KR)

(72) Inventors: Ashish Chopra, Noida (IN); Bapi Reddy Karri, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 253 days.

(21) Appl. No.: 17/339,449

(22) Filed: Jun. 4, 2021

(65) Prior Publication Data

US 2021/0407057 A1 Dec. 30, 2021

(30) Foreign Application Priority Data

Jun. 29, 2020 (IN) .............................. 202041027623
Dec. 3, 2020 (KR) ........................ 10-2020-0167701

(51) Int. Cl.
  *G06T 5/50* (2006.01)
  *G06T 3/40* (2006.01)
  *G06T 7/11* (2017.01)

(52) U.S. Cl.
  CPC .............. *G06T 5/50* (2013.01); *G06T 3/4038* (2013.01); *G06T 7/11* (2017.01);
  (Continued)

(58) Field of Classification Search
  CPC ......... H04N 13/128; H04N 2013/0081; H04N 13/122; H04N 13/243; H04N 13/239;
  (Continued)

(56) References Cited

U.S. PATENT DOCUMENTS 8,199,222 B2   6/2012 Drimbarean et al.
8,547,442 B2 * 10/2013 Lasang .................. H04N 5/144
                                                              348/241
(Continued)

FOREIGN PATENT DOCUMENTS

CN      110072051 A      7/2019
CN      110166708 A      8/2019
(Continued)

OTHER PUBLICATIONS

Written Opinion (PCT/ISA/237) dated Oct. 20, 2021 by the International Searching Authority for International Application No. PCT/KR2021/008075.
(Continued)

*Primary Examiner* — Edward F Urban
*Assistant Examiner* — Benedict E Lee
(74) *Attorney, Agent, or Firm* — Sughrue Mion, PLLC

(57) ABSTRACT

An electronic device includes a plurality of cameras, and at least one processor connected to the plurality of cameras. The at least one processor is configured to, based on a first user command to obtain a live view image, segment an image frame obtained via a camera among the plurality of cameras into a plurality of regions based on a brightness of pixels and an object included in the image frame; obtain a plurality of camera parameter setting value sets, each including a plurality of parameter values with respect to the plurality of regions; based on a second user command to capture the live view image, obtain a plurality of image frames using the plurality of camera parameter setting value sets and at least one camera among the plurality of cameras; and obtain an image frame by merging the plurality of obtained image frames.

18 Claims, 29 Drawing Sheets

(52) U.S. Cl.
CPC ............... *G06T 2207/10024* (2013.01); *G06T 2207/20021* (2013.01); *G06T 2207/20221* (2013.01)

(58) Field of Classification Search
CPC ........... H04N 23/81; G06T 5/00; G06T 5/002; G06T 2207/10012; G06T 7/00; G06T 7/55; G06T 7/85; G06T 7/97
See application file for complete search history.

(56) References Cited

U.S. PATENT DOCUMENTS

| | | | |
|---|---|---|---|
| 9,270,875 B2 | 2/2016 | Brisedoux et al. | |
| 9,313,390 B2 | 4/2016 | Velarde et al. | |
| 10,091,429 B2* | 10/2018 | Kim | H04N 23/667 |
| 10,194,089 B2* | 1/2019 | Nash | H04N 5/268 |
| 10,225,445 B2 | 3/2019 | Lautenbach | |
| 10,250,820 B2 | 4/2019 | Choi et al. | |
| 11,032,484 B2* | 6/2021 | Nishio | H04N 23/667 |
| 11,412,153 B2 | 8/2022 | Chen | |
| 2014/0218559 A1 | 8/2014 | Yamaguchi et al. | |
| 2016/0309133 A1 | 10/2016 | Laroia et al. | |
| 2017/0318226 A1* | 11/2017 | Jung | H04N 23/741 |
| 2018/0109722 A1 | 4/2018 | Laroia et al. | |
| 2018/0220061 A1 | 8/2018 | Wang et al. | |
| 2018/0260668 A1 | 9/2018 | Shen et al. | |
| 2019/0130624 A1 | 5/2019 | Miao et al. | |
| 2019/0147564 A1 | 5/2019 | Yuan et al. | |
| 2019/0199926 A1* | 6/2019 | An | H04N 23/632 |
| 2020/0043197 A1 | 2/2020 | Bazin et al. | |
| 2020/0193635 A1* | 6/2020 | Su | G06T 7/73 |
| 2020/0244865 A1 | 7/2020 | Chen | |
| 2020/0329187 A1 | 10/2020 | Huang | |
| 2020/0364830 A1* | 11/2020 | Manimaran | G06T 5/009 |
| 2021/0233326 A1* | 7/2021 | Li | G06T 7/593 |
| 2021/0390283 A1* | 12/2021 | Futatsugi | G06F 18/2431 |
| 2022/0210308 A1* | 6/2022 | Zhou | H04N 23/631 |

FOREIGN PATENT DOCUMENTS

| | | | |
|---|---|---|---|
| JP | 2002230552 A | * | 8/2002 |
| KR | 10-2015-0132920 A | | 11/2015 |
| WO | 2019/091412 A1 | | 5/2019 |

OTHER PUBLICATIONS

International Search Report (PCT/ISA/210) dated Oct. 20, 2021 by the International Searching Authority for International Application No. PCT/KR2021/008075.

Zhenqiang Ying et al., "A New Low-Light Image Enhancement Algorithm using Camera Response Model", Computer Vision Foundation, IEEE, 2017, 8 pages total.

Yahong Wu et al., "A New Low Light Image Enhancement Based on the Image Degradation Model", Proceedings of ICSP2018, IEEE, 2018, 5 pages total.

Li Tao et al., "LLCNN: A Convolutional Neural Network for Low-light Image Enhancement", VCIP 2017, IEEE, Dec. 2017, 4 pages total.

Qiang Dai et al., "Fractional-Order Fusion Model for Low-Light Image Enhancement", Symmetry, 11, 574, doi: 10.3390/sym11040574, MDPI, Apr. 2019, 17 pages total.

Chongyi Li et al., "LightenNet: a Convolutional Neural Network for weakly illuminated image enhancement", Pattern Recognition Letters, DOI: 10.1016/j.patrec.2018.01.010, 2018, 12 pages total.

Communication dated Jan. 12, 2022 issued by the Indian Patent Office in Indian Application No. 202041027623.

Communication dated Jun. 13, 2023, issued by the European Patent Office in European Application No. 21832591.8.

* cited by examiner (ISO, Shutter Speed, Aperture)
= (0.2, 0.1, 1)  ~621

(ISO, Shutter Speed, Aperture)
= (0.1, 0.3, 1)  ~622

(ISO, Shutter Speed, Aperture)
= (0.4, 0.6, 2)  ~623

(ISO, Shutter Speed, Aperture)
= (0.6, 0.7, 3)  ~624

→

(ISO, Shutter Speed, Aperture)
= (0.2, 0.1, 1)  ~621

(ISO, Shutter Speed, Aperture)
= (0.1, 0.3, 1)  ~622

(ISO, Shutter Speed, Aperture)
= (0.2, 0.3, 1)  ~625

(ISO, Shutter Speed, Aperture)
= (0.1, 0.1, 1)  ~626

(ISO, Shutter Speed, Aperture)
= (0.4, 0.6, 2)  ~623

(ISO, Shutter Speed, Aperture)
= (0.6, 0.7, 3)  ~624

FIG. 20
(a)
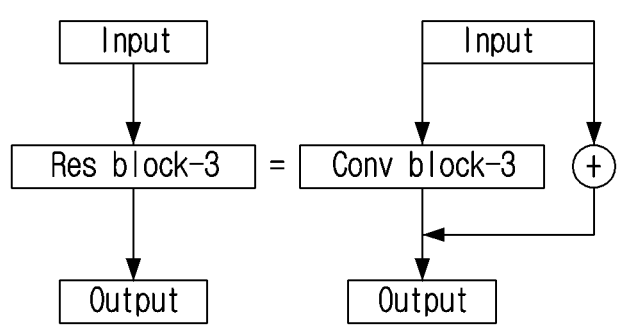
(b)
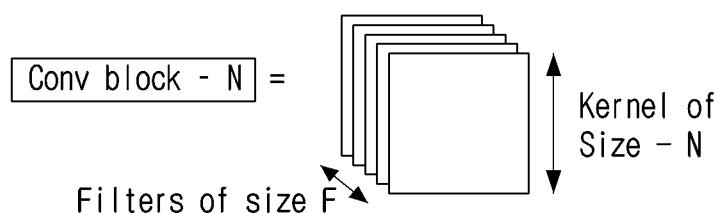

FIG. 22
(a)
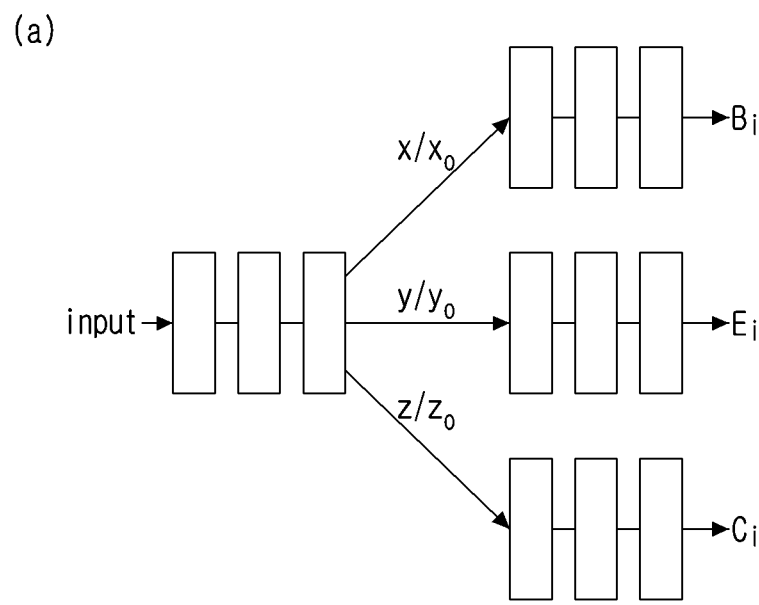
(b)
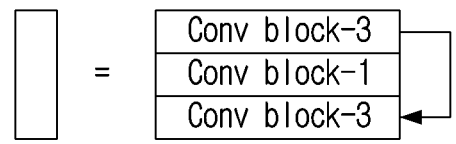

ELECTRONIC DEVICE AND CONTROLLING METHOD OF ELECTRONIC DEVICE

CROSS-REFERENCES TO RELATED APPLICATION

This application is based on and claims priority under 35 U.S.C. § 119 to Korean Patent Application No. 10-2020-0167701, filed on Dec. 3, 2020, in the Korean Intellectual Property Office and Indian Patent Application No. 202041027623, filed on Jun. 29, 2020, in the Indian Patent Office, the disclosures of which are incorporated by reference herein in their entireties.

BACKGROUND

1. Field

The disclosure relate to an electronic device and a method for controlling an electronic device, and more particularly, to an electronic device that obtains an image frame based on a user command for capturing and a method for controlling the electronic device.

2. Description of Related Art

In recent years, an electronic device including a plurality of cameras have been variously developed along with the development of electronic technologies.

When an image frame is generated based on a capturing command of a user using an electronic device including a plurality of cameras, there is a need for providing an image frame with higher quality.

SUMMARY

Provided are an electronic device that obtains a plurality of parameter values using a live view image and obtains an image frame corresponding to a command using the plurality of parameter values, and a method for controlling the electronic device.

In accordance with an aspect of the disclosure, there is provided an electronic device including a plurality of cameras, and at least one processor communicatively connected to the plurality of cameras, in which the at least one processor is configured to, based on a first user command to obtain a live view image, segment an image frame obtained via a camera among the plurality of cameras into a plurality of regions based on a brightness of pixels and an object included in the image frame, obtain a plurality of camera parameter setting value sets, each camera parameter setting value set including a plurality of parameter values respectively with respect to the plurality of regions, based on a second user command to capture the live view image, obtain a plurality of image frames by applying the plurality of camera parameter setting value sets to at least one camera among the plurality of cameras, and obtain an image frame corresponding to the second user command by merging the plurality of obtained image frames.

The at least one processor may be configured to obtain a plurality of first camera parameter setting value sets by inputting the plurality of regions to a first neural network model, and obtain the plurality of camera parameter setting value sets by inputting the plurality of first camera parameter setting value sets, the image frame obtained via the camera, and a plurality of parameter values of the camera to a second neural network model.

The first neural network model may be a neural network model trained based on a region obtained from an image frame, a plurality of parameter values of a camera which has obtained the image frame, and an edge index, a contrast index, and a background index of the region.

Based on a camera parameter setting value set, the image frame obtained through the camera, and a plurality of parameter values of the camera being input, the second neural network model may be configured to output information regarding an edge index, a contrast index, and a background index of the input image frame corresponding to the input camera parameter setting value set, and the at least one processor may be configured to obtain a camera parameter setting value set corresponding to a maximum edge index, a camera parameter setting value set corresponding to a maximum contrast index, and a camera parameter setting value set corresponding to a maximum background index among the plurality of first camera parameter setting value sets, based on the information regarding the edge index, the contrast index, and the background index obtained from the second neural network model.

The at least one processor may be configured to identify pixel values of pixels included in each camera parameter setting value set of the plurality of regions, and obtain the plurality of camera parameter setting value sets based on the identified pixel values and a predefined rule.

The at least one processor may be configured to, based on the second user command to capture the live view image, obtain an image frame by applying one camera parameter setting value set among the plurality of camera parameter setting value sets to a first camera among the plurality of cameras, and obtaining at least two image frames by applying at least two camera parameter setting value sets among the plurality of camera parameter setting value sets to a second camera among the plurality of cameras.

The at least one processor may be configured to obtain the image frame corresponding to the second user command by inputting the merged image frame to a third neural network model.

Each of the plurality of obtained image frames may be a Bayer raw image.

The image frame obtained from the third neural network model may be an image frame subjected to at least one of black level adjustment, color correction, gamma correction, or edge enhancement.

In accordance with another aspect of the disclosure, there is provided a method for controlling an electronic device including a plurality of cameras, the method including, based on a first user command to obtain a live view image, segmenting an image frame obtained via a camera among the plurality of cameras into a plurality of regions based on a brightness of pixels and an object included in the image frame, obtaining a plurality of camera parameter setting value sets, each camera parameter setting value set including a plurality of parameter values respectively with respect to the plurality of regions, based on a second user command to capture the live view image, obtaining a plurality of image frames by applying the plurality of camera parameter setting value sets to a camera among the plurality of cameras, and obtaining an image frame corresponding to the second user command by merging the plurality of obtained image frames.

The obtaining the plurality of camera parameter setting value sets may include obtaining a plurality of first camera parameter setting value sets by inputting the plurality of regions to a first neural network model, and obtaining the plurality of camera parameter setting value sets by inputting the plurality of first camera parameter setting value sets, the image frame obtained via the camera, and a plurality of parameter values of the camera to a second neural network model.

The first neural network model may be a neural network model trained based on a region obtained from an image frame, a plurality of parameter values of a camera which has obtained the image frame, and an edge index, a contrast index, and a background index of the region.

Based on a camera parameter setting value set, the image frame obtained through the camera, and a plurality of parameter values of the camera being input, the second neural network model may be configured to output information regarding an edge index, a contrast index, and a background index of the input image frame corresponding to the input camera parameter setting value set, and the obtaining the plurality of camera parameter setting value sets may include obtaining a camera parameter setting value set corresponding to a maximum edge index, a camera parameter setting value set corresponding to a maximum contrast index, and a camera parameter setting value set corresponding to a maximum background index among the plurality of first camera parameter setting value sets, based on the information regarding the edge index, the contrast index, and the background index obtained from the second neural network model.

The obtaining the plurality of camera parameter setting value sets may include identifying pixel values of pixels included in each of the plurality of regions, and obtaining the plurality of camera parameter setting value sets based on the identified pixel values and a predefined rule.

The obtaining the plurality of image frames may include, based on the second user command to capture the live view image, obtaining an image frame by applying one camera parameter setting value set among the plurality of camera parameter setting value sets to a first camera among the plurality of cameras, and obtaining at least two image frames by applying at least two camera parameter setting value sets among the plurality of camera parameter setting value sets to a second camera among the plurality of cameras.

The obtaining the image frame may include obtaining the image frame corresponding to the second user command by inputting the merged image frame to a third neural network model.

Each of the plurality of obtained image frames may be a Bayer raw image.

The image frame obtained from the third neural network model may be an image frame subjected to at least one of black level adjustment, color correction, gamma correction, or edge enhancement.

The plurality of parameter values included in each camera parameter setting value set may include an International Organization for Standardization (ISO) value, a shutter speed, and an aperture of the at least one camera, to which the plurality of camera parameter setting value sets are applied, may have a size that is equal to the aperture included in the plurality of camera parameter setting value sets.

In accordance with another aspect of an example embodiment of the disclosure, there is provided a non-transitory computer-readable storage medium storing program code, the program code being executable by at least one processor to cause the at least one processor to control an electronic device comprising a plurality of cameras by performing the foregoing method(s).

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 20 is a diagram illustrating a structure of a first neural network model according to an embodiment;

FIG. 22 is a diagram illustrating a structure of a second neural network model according to an embodiment;

DETAILED DESCRIPTION

Figure 1:
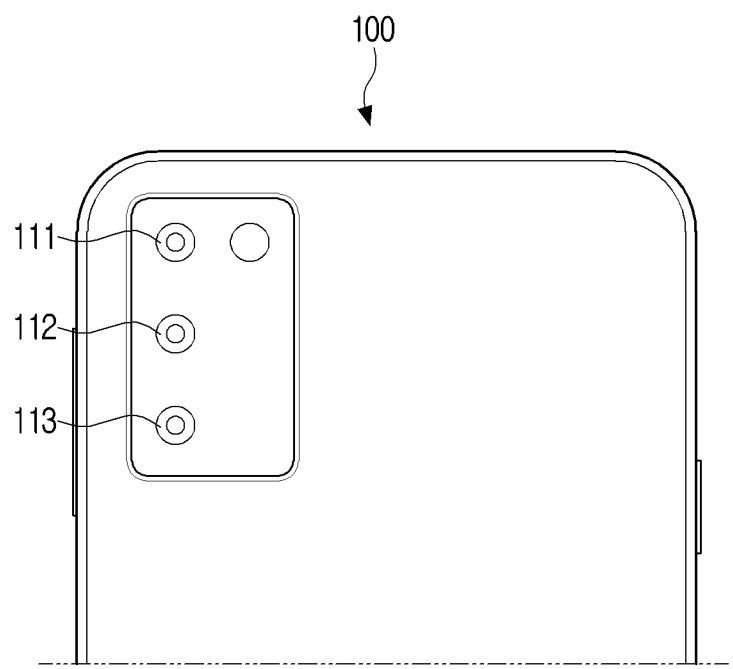
FIG. 1 is a diagram schematically illustrating an electronic device according to an embodiment.

Hereinafter, embodiments will be described in greater detail with reference to the accompanying drawings. The embodiments may be variously changed and may include other embodiments. Specific embodiments will be shown in the drawings and described in detail in the description. It should be noted that the embodiments are not intended to be limiting the scope of the disclosure, but they should be interpreted to include all modifications, equivalents and/or alternatives of the example embodiments of the disclosure. In relation to explanation of the drawings, similar reference numerals may be used for similar elements.

In describing the disclosure, a detailed description of the related art or configuration may be omitted when it is determined that the detailed description may unnecessarily obscure a gist of the disclosure.

In addition, the embodiments described herein may be changed in various forms and the scope of the disclosure is not limited to these embodiments. The embodiments are provided to complete the disclosure and to fully inform a person of ordinary skill in the art of the scope of the disclosure.

The terms used in the disclosure are merely used for describing specific embodiments and do not limit the scope of the disclosure. Unless otherwise defined specifically, a singular expression may encompass a plural expression.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B," include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on embodiments. The expression "configured to" does not necessarily refer to a device being "specifically designed to" in terms of hardware.

Instead, under some circumstances, the expression "a device configured to" may refer to the device being "capable of" performing an operation together with another device or component. For example, the phrase "a unit or a processor configured (or set) to perform an operation" may refer, for example, and without limitation, to a dedicated processor (e.g., an embedded processor), a generic-purpose processor (e.g., a central processing unit (CPU) or an application processor), or the like, that is capable of performing the corresponding operation by executing one or more software programs stored in a memory device.

A term such as "module" or a "unit" in the embodiment may perform at least one function or operation, and may be implemented as hardware, software, or a combination of hardware and software. Further, except for when each of a plurality of "modules", "units", and the like needs to be realized in specific hardware, the components may be integrated in at least one module and be implemented in at least one processor.

Various elements and areas in the drawings are schematically illustrated. Therefore, the scope of the disclosure is not limited by comparative sizes or intervals illustrated in the accompanying drawings.

Hereinafter, with reference to the accompanying drawings, embodiments of the disclosure will be described in detail so that those skilled in the art to which the disclosure pertains may easily practice the disclosure.

FIG. 1 is a diagram schematically illustrating an electronic device according to an embodiment.

As illustrated in FIG. 1, an electronic device 100 according to an embodiment of the disclosure may include a plurality of cameras 111, 112, and 113.

For example, the electronic device 100 may be implemented as a smartphone as illustrated in FIG. 1. However, the electronic device 100 according to the disclosure is not limited to a specific type of A device and may be implemented as various types of electronic devices such as a tablet personal computer (PC), a personal digital assistant (PDA), a smart watch, a laptop computer, a virtual reality (VR) device, an Internet of Things (IoT) device, and a digital camera.

Each of the plurality of cameras 111, 112, and 113 according to the disclosure may include an image sensor and a lens.

Here, fields of view (FOV) of the lenses may be different from each other. For example, as illustrated in FIG. 1, the plurality of cameras 111, 112, and 113 may include a telephoto lens, a wide angle lens, and a super wide angle lens disposed on a rear surface of the electronic device 100. However, the number and type of the lenses according to the disclosure have no particular limits.

Figure 2:
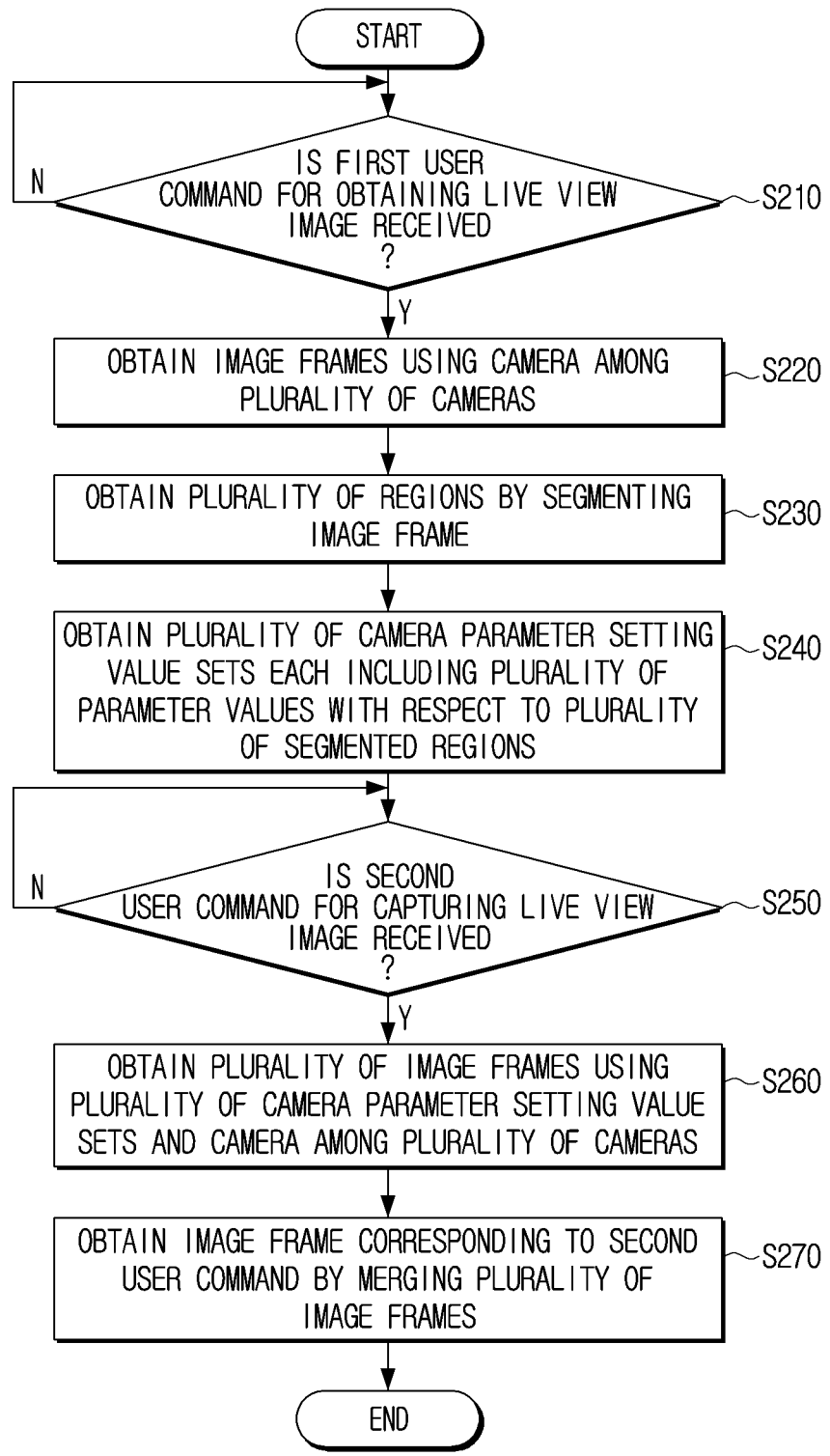
FIG. 2 is a flowchart illustrating a method for controlling an electronic device according to an embodiment.

FIG. 2 is a flowchart illustrating a method for controlling an electronic device according to an embodiment.

As illustrated in FIG. 2, the electronic device 100 according to an embodiment of the disclosure may receive a first user command for obtaining a live view image (S210).

The live view image herein may refer to an image displayed on a display of the electronic device 100, which is obtained by converting light incident through a lens of a camera into an electric image signal via an image sensor of the camera.

The user command may be, for example, a user command for driving a camera application stored in the electronic device 100. Such a user command may be received based on a user touch input via the display of the electronic device 100, a user voice received via a microphone of the electronic device 100, an input via a physical button provided on the electronic device 100, a control signal transmitted by a remote control device for controlling the electronic device 100, and the like.

Based on a user command for obtaining the live view image being received, the electronic device 100 may obtain a plurality of image frames using the camera (S220).

Hereinafter, the description is made based on the assumption that the electronic device 100 obtains a plurality of image frames by driving the camera 111 among the plurality of cameras 111, 112, 113. However, this is merely an example for describing the operations of the electronic device 100 according to the disclosure, and there is no limitation to the operations of the electronic device 100. For example, the electronic device 100 may obtain a plurality of image frames by driving one of the cameras 112 and 113.

When the camera 111 is used to obtain a plurality of image frames, the camera 111 may obtain the plurality of image frames based on a plurality of parameter values of the camera 111.

Hereinafter, the plurality of parameters may include International Organization for Standardization (ISO), a shutter speed, and an aperture. However, this is merely an example and the plurality of parameters are not limited thereto.

The ISO may be a parameter for controlling reactivity (or sensitivity) of an image sensor to light. Although the same amount of light is incident to the image sensor of the camera, a brightness of the image frame varies depending on an ISO value set for the camera. For example, although the same amount of light is incident to the image sensor of the camera, as the ISO value is great, the image frame becomes brighter, and as the ISO value is small, the image frame becomes darker.

A shutter speed may be a parameter for controlling a time length during which the image sensor is exposed to light. According to a shutter speed value set for the camera, the time length during which the image sensor is exposed to light for obtaining an image frame may be determined. For example, as the shutter speed is high, the time during which the image sensor is exposed to light is reduced, and as the shutter speed is low, the time during which the image sensor is exposed to light is extended.

The aperture may be a parameter related to a region (that is, a hole of an aperture) to which light is incident to the image sensor via the aperture, and may be represented by an f-number value which is a ratio of a focal length of the lens to an aperture diameter. The amount of light incident to the image sensor may vary depending on the size of the region corresponding to the aperture. For example, as the aperture value (e.g., f-number value) is small, the size of the region is large and a larger amount of light may be incident to the image sensor.

All of the plurality of cameras may have fixed aperture values. In other words, the size of the hole of the aperture may not be changed and the fixed size may be provided for each camera.

Accordingly, the camera 111 may obtain a plurality of image frames based on the ISO value, the shutter speed value, and the aperture value of the camera 111.

In other words, the electronic device 100 may set the ISO and the shutter speed of the camera 111 using the ISO value and the shutter speed value that are determined as corresponding to the camera 111 and obtain the plurality of image frames by driving the camera 111 based on the set ISO value and shutter speed value. The hole of the aperture of the camera 111 may have a size corresponding to the aperture value.

In the disclosure, it is assumed that the ISO value and the shutter speed value of the plurality of cameras 111, 112, and 113 are normalized as values between 0 to 1 (e.g., 0.1, 0.2, 0.3, . . . , 0.8, 0.9, 1.0). In addition, in the disclosure, it is assumed that the aperture value of the camera 111 is 1, the aperture value of the camera 112 is 2, and the aperture value of the camera 113 is 3. Here, the aperture value of 1, 2, or 3 does not imply that the actual aperture values of the cameras 111, 112, and 113 are 1, 2, or 3, but is set for distinguishing the cameras 111, 112, and 113 according to the aperture values. In other words, the aperture value of each of the cameras 111, 112, and 113 may be, for example, one of various aperture values such as F/1.8, F/2.0, F/2.2, F/2.4, and F/2.8.

In addition, the electronic device 100 may display the live view image on the display of the electronic device 100 using the plurality of image frames.

Specifically, the electronic device 100 may temporarily store the plurality of image frames obtained through the camera 111 in a volatile memory such as a frame buffer of the electronic device 100, and display the live view image on the display of the electronic device 100 using the plurality of image frames.

The electronic device 100 may obtain a plurality of regions by segmenting an image frame (S230). For example, the electronic device 100 may obtain an image frame through the camera 111 and obtain a plurality of regions by segmenting the image frame.

Specifically, the electronic device 100 may obtain the plurality of regions by segmenting the image frame based on brightness of pixels and objects included in the image frame.

First, the electronic device 100 may obtain the plurality of regions by segmenting the image frame based on brightness of pixels included in the image frame.

The brightness of the pixel herein may refer to a pixel value of a pixel (e.g., pixel value of a pixel in a grayscale image).

In addition, segmentation based on the brightness of the pixels may imply that the segmentation is based on light intensity. This is because the brightness of pixels corresponding to a subject in the image frame obtained through the camera varies depending on the light intensity applied to the subject.

In this case, the electronic device 100 may obtain information regarding the plurality of regions segmented from the image frame by using a neural network model. The neural network model herein may refer to a model trained by image frames, each of which is segmented into a plurality of regions based on the brightness of the pixels.

In other words, the electronic device 100 may input the image frame to the neural network model, and obtain information regarding the plurality of regions segmented from the image frame based on the brightness of pixel from the neural network model.

The inputting of the image frame to the neural network model herein may refer to inputting of pixel values (e.g., R, G, and B pixel values) of pixels included in the image frame. In addition, the information regarding the plurality of regions may include position information of the plurality of regions. In this case, the position information may include coordinate values of pixels included in each region.

Figure 3A:
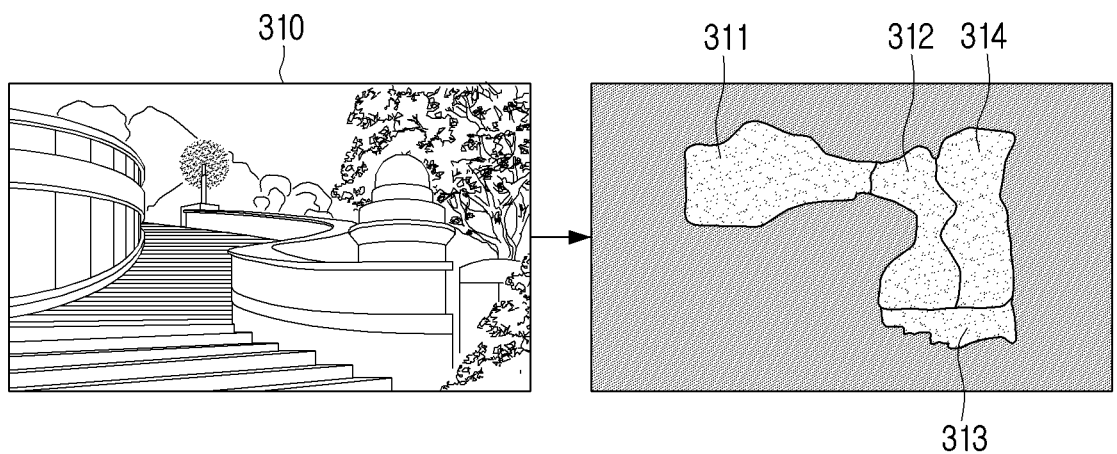
FIG. 3A is a diagram illustrating a method for segmenting an image frame into a plurality of regions according to an embodiment.

For example, as illustrated in FIG. 3A, the electronic device 100 may obtain a plurality of regions 311, 312, 313, and 314 segmented from an image frame 310 based on brightness of pixels. In this case, a region having brightness equal to or more than a threshold brightness is determined from the image frame 310 based on the brightness and the region having the brightness equal to or more than the threshold brightness may be divided into the plurality of regions 311, 312, 313, and 314.

In addition, the electronic device 100 may obtain the plurality of regions by segmenting the image frame based on objects included in the image frame.

The objects herein may include various types of objects with various structures (or shapes) such as persons, animals, plants, buildings, objects, geographies, and the like.

The electronic device 100 may obtain information regarding the plurality of regions segmented from the image frame based on objects included in the image frame using the neural network model.

The neural network model herein may refer to a model trained by the image frames each divided into the plurality of regions based on the objects. For example, the neural network model may refer to an object segmentation model. The object segmentation model may identify objects included in an input image frame, structures of the objects, and the like, and output information regarding a region of the object corresponding to the object.

In other words, the electronic device 100 may input the image frame to the neural network model, and obtain information regarding the plurality of regions segmented from the image frame based on the objects from the neural network model.

The inputting of the image frame to the neural network model herein may refer to inputting of pixel values (e.g., R, G, and B pixel values) of pixels included in the image frame. In addition, the information regarding the plurality of regions may include position information each of the plurality of regions. In this case, the position information may include coordinate values of pixels included in each region.

Figure 3B:
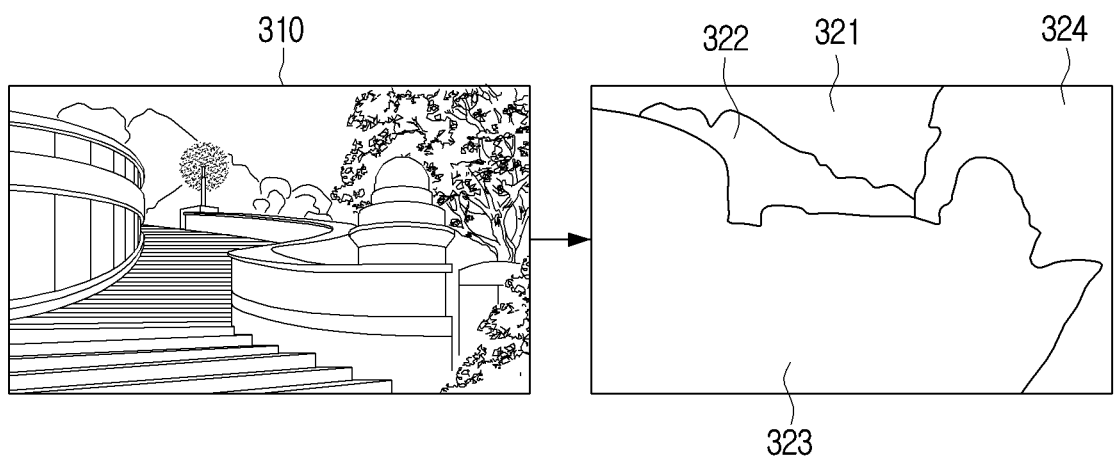
FIG. 3B is a diagram illustrating a method for segmenting an image frame into a plurality of regions according to an embodiment.

For example, as illustrated in FIG. 3B, the electronic device 100 may obtain a plurality of regions 321, 322, 323, and 324 segmented from the image frame 310 based on objects.

Then, the electronic device 100 may segment the image frame 310 into a plurality of regions based on the plurality of regions segmented based on the brightness of pixels and the plurality of regions segmented based on the objects included in the image frame 310.

The electronic device 100 may segment the image frame into the plurality of regions using k-means clustering. The k-means clustering herein may refer to an algorithm for segmenting data into k pieces of clusters based on a distance between data and a centroid of each cluster.

Specifically, the electronic device 100 may identify a number of clusters based on a number of regions segmented from the image frame based on the brightness of the pixels and a number of regions segmented from the image frame based on the objects.

The electronic device 100 may segment the image frame for each of the identified number of clusters using the k-means clustering.

For example, if the image frame 310 is segmented into the four regions 311, 312, 313, and 314 based on the brightness of pixels as illustrated in FIG. 3A, and the image frame 310 is segmented into the four regions 321, 322, 323, and 324 based on the objects as illustrated in FIG. 3B, the electronic device 100 may assume that there are eight clusters in total (that is, four regions based on brightness of pixels and four regions based on objects).

As described above, if there are eight clusters, the electronic device 100 may segment the image frame into one region, two regions, . . . , and eight regions based on pixel values of the pixels using k-means clustering (k=1, 2, . . . , 8).

Then, the electronic device 100 may calculate an entropy of each segmented image frame and identify an image frame having a largest calculated entropy.

As in the above example, if the image frame is segmented into each of one region, two regions, . . . , and eight regions, there may be an image frame segmented into one region, an image frame segmented into two regions, . . . , and an image frame segmented into eight regions.

In this case, the electronic device 100 may calculate an entropy E(i) of each segmented image frame based on Mathematical Expression 1 below.

$$E(i) = -\sum_{1}^{i} P_i \ln P_i \qquad \text{[Mathematical Expression 1]}$$

Herein, $$P_i = \frac{n}{N}$$

is satisfied. n represents the number of pixels in each region in the segmented image frame and N represents a total number of pixels of each segmented image frame.

Figure 3C:
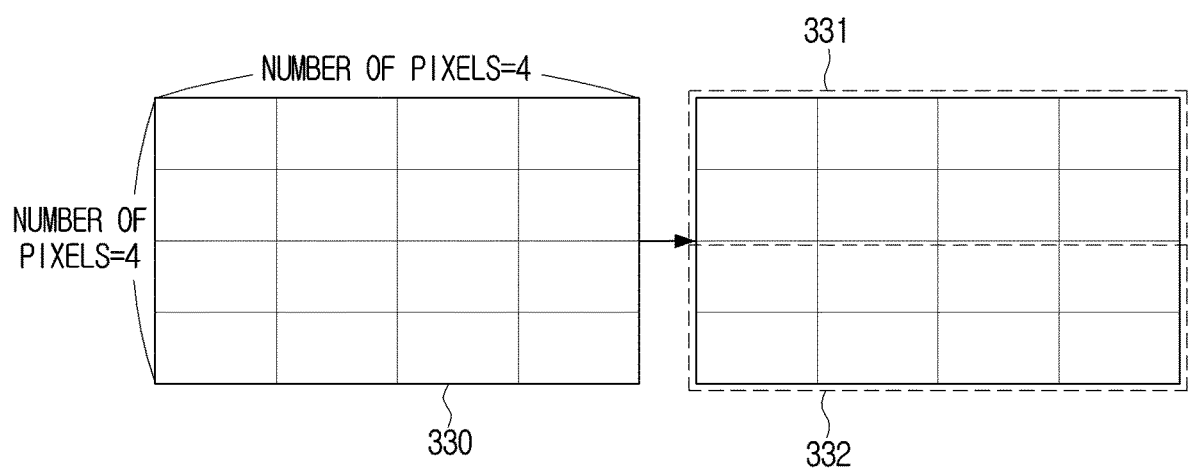
FIG. 3C is a diagram illustrating a method for segmenting an image frame into a plurality of regions according to an embodiment.

For example, as illustrated in FIG. 3C, it is assumed that an image frame 330 configured with 16 pixels in total is segmented into two regions 331 and 332 using k-means clustering (k=2).

If each of the regions 331 and 332 is configured with eight pixels, $P_1$ of the region 331 is 8/16 and $P_2$ of the region 332 is 8/16. Accordingly, an entropy E of the image frame may be calculated as:

$$E = -(P_1 \ln P_1 + P_2 \ln P_2) = -\left(\frac{8}{16}\ln\frac{8}{16} + \frac{8}{16}\ln\frac{8}{16}\right) = 0.693.$$

Through the above method, the electronic device 100 may calculate an entropy of the image frame segmented into one region, an entropy of the image frame segmented into two regions, . . . , and an entropy of the image frame segmented into eight regions.

In addition, the electronic device 100 may segment the image frame into the plurality of regions based on an image frame with the largest calculated entropy. In other words, the electronic device 100 may identify a plurality of regions segmented from the image frame with the largest calculated entropy, as a plurality of regions segmented from the image frame based on the brightness of pixels and the objects.

Figure 3D:
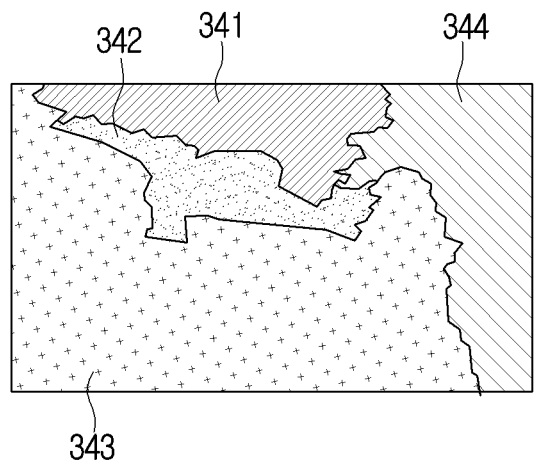
FIG. 3D is a diagram illustrating a method for segmenting an image frame into a plurality of regions according to an embodiment.

In the above example, if the entropy of the image frame segmented into four regions has a largest value among the calculated entropies, the electronic device 100 may segment the image frame 310 into four regions 341, 342, 343, and 344, as illustrated in FIG. 3D.

Therefore, the electronic device 100 may segment the image frame into a plurality of regions in consideration of the brightness of pixels and the objects through the above method.

The electronic device 100 may obtain a plurality of camera parameter setting value sets, each set including a plurality of parameter values based on the plurality of regions (S240).

The camera parameter setting value set herein may be configured with the plurality of parameter values. For example, the setting value set may include the ISO value, the shutter speed value, and the aperture value.

The electronic device 100 may obtain the plurality of camera parameter setting value sets using the neural network model.

Figure 4:
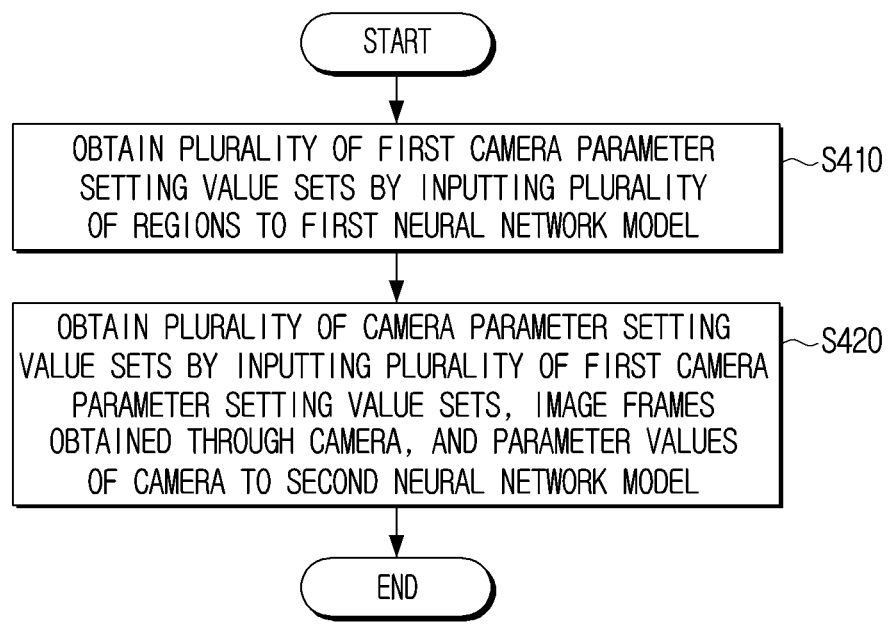
FIG. 4 is a flowchart illustrating a method for obtaining a plurality of camera parameter setting value sets according to an embodiment.

FIG. 4 is a flowchart illustrating a method for obtaining a plurality of camera parameter setting value sets according to an embodiment. Referring to FIG. 4, the electronic device 100 may obtain a plurality of first camera parameter setting value sets by inputting the plurality of regions to a first neural network model (S410).

The inputting of the region to the first neural network model herein may refer to inputting of pixel values (e.g., R, G, and B pixel values) of pixels included in the region.

The first neural network model may output a plurality of camera parameter setting value sets respectively corresponding to the plurality of input regions.

The first neural network model may output the camera parameter setting value sets respectively corresponding to the plurality of input regions.

The camera parameter setting value set herein may include the ISO value, the shutter speed value, and the aperture value.

The expression "corresponding to" may imply that the camera parameter setting value set output from the first neural network model includes a plurality of desired (or optimal) parameter values of the input region. The "desired" herein may imply that, if the input region is obtained through the camera using the camera parameter setting value set output from the first neural network model, the corresponding region would be further enhanced in terms of an image index.

For this, the first neural network model may be trained based on a region obtained from the image frame, a plurality of parameter values of the camera which has obtained the image frame, and image indexes of the region.

The image indexes herein may include an edge index, a contrast index, and a background index (or background noise index).

Hereinafter, a process of training the first neural network model will be described more specifically with reference to FIG. 5.

Figure 5:
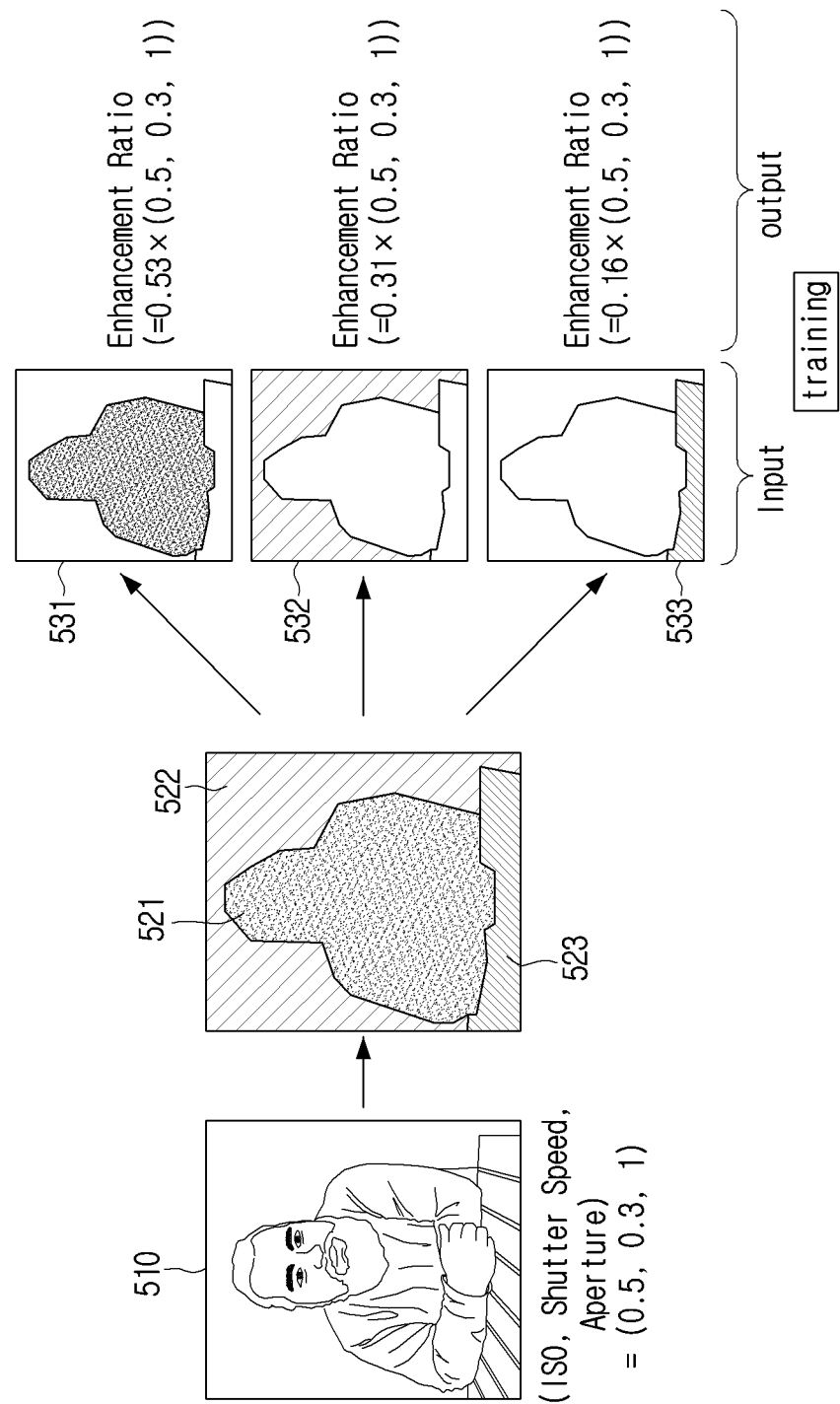
FIG. 5 is a diagram illustrating a process of training a first neural network model according to an embodiment.

Referring to FIG. 5, an image frame 510 may be segmented into a plurality of regions 521, 522, and 523.

For example, the image frame 510 may be segmented into the plurality of regions 521, 522, and 523 based on information corresponding to a position of an object obtained through an object detection model. The object detection model may output information regarding a region of an object corresponding to a shape of an object included in the input image frame 510.

Then, an edge index, a contrast index, and a background index of each of the plurality of regions 521, 522, and 523 may be calculated.

The edge index may be an index for indicating a sharpness of the image frame (or region of image frame). A large edge index value indicates a sharp image frame.

The contrast index may be an index for indicating a brightness of the image frame (or region of image frame). A large contrast index indicates a bright image frame.

The background index may be an index for indicating a degree of noise of a background region of the image frame (or region of image frame). A large background index indicates an image frame including a background region with less noise.

An enhancement ratio of each of the plurality of regions 521, 522, and 523 may be calculated using the edge index, the contrast index, and the background index calculated regarding each of the plurality of regions 521, 522, and 523.

Specifically, when an edge index, a contrast index, and a background index calculated regarding a given segmented region are defined as $Edge_{index}$, $Contrast_{index}$, and $Background_{index}$, respectively, an enhancement ratio of the corresponding region may be calculated as $$\text{Enhancement Ratio} = \frac{Edge_{index} + Contrast_{index} + Background_{index}}{3}.$$

In other words, the enhancement ratio may be an average of the edge index, the contrast index, and the background index.

The plurality of regions 521, 522, and 523 may be converted into individual image frames 531, 532, and 533.

The converting the plurality of regions 521, 522, and 523 into the individual image frames 531, 532, and 533 may refer to obtaining pixel values (e.g., R, G, and B pixel values) of pixels included in each of the regions 521, 522, and 523 and generating the image frames 531, 532, and 533 by using the obtained pixel values.

In this case, each of the image frames 531, 532, and 533 may be input data of the first neural network model. In other words, the input data may include pixel values of pixels included in each of the regions 521, 522, and 523.

In addition, output data of the first neural network model corresponding to each of the plurality of image frames 531, 532, and 533 (e.g., input data) may be obtained by multiplying the plurality of parameter values of the camera used for obtaining the image frame 510 by the calculated enhancement ratio of each of the plurality of regions 521, 522, and 523.

For example, referring to FIG. 5, it is assumed that the image frame 510 is obtained through a camera (not illustrated) having an ISO value, a shutter speed value, and an aperture value of 0.5, 0.3, and 1, respectively, and the enhancement ratios of the regions 521, 522, and 523 are calculated as 0.53, 0.31, and 0.16, respectively.

In this case, the output data corresponding to the image frame 531 may be obtained as 0.53×(0.5, 0.3, 1)=(0.265, 0.159, 0.53). In addition, the output data corresponding to the image frame 532 may be obtained as 0.31×(0.5, 0.3, 1)=(0.155, 0.093, 0.31), and the output data corresponding to the image frame 533 may be obtained as 0.16×(0.5, 0.3, 1)=(0.08, 0.048, 0.16).

Hereinafter, the first neural network model may be trained based on the input/output data (e.g., pairs of input data and output data). In this case, the first neural network model may be trained based on the input/output data obtained from a large number of image frames through the method described with reference to FIG. 5.

Specifically, the first neural network model which outputs the ISO value, the shutter speed value, and the aperture value with respect to the input data may be generated. Each of the ISO value and the shutter speed value herein may be a value among values between 0 and 1 and the aperture value may be a value of 1, 2, and 3, for ease of description.

Hereinafter, the input data may be input to the first neural network model, and the first neural network model may be trained so as to minimize a loss (e.g., loss function) between the ISO value, the shutter speed value, and the aperture value output from the first neural network model and the output data.

As described above, in the disclosure, the enhancement ratio is calculated based on the image indexes indicating the quality of the region, and accordingly, the enhancement ratio may be an index for evaluating whether the plurality of parameter values of the camera used for obtaining the region are appropriate values for the corresponding region in terms of image indexes. Accordingly, if the enhancement ratio is used in the training of the first neural network model as a weightage factor of the plurality of parameter values used for obtaining the region, the first neural network model may be trained so as to output a plurality of parameter values for enhancing the image indexes of the input image.

As described above, the electronic device 100 may obtain a plurality of first camera parameter setting value sets by inputting a plurality of regions to a first neural network model.

Figure 6:
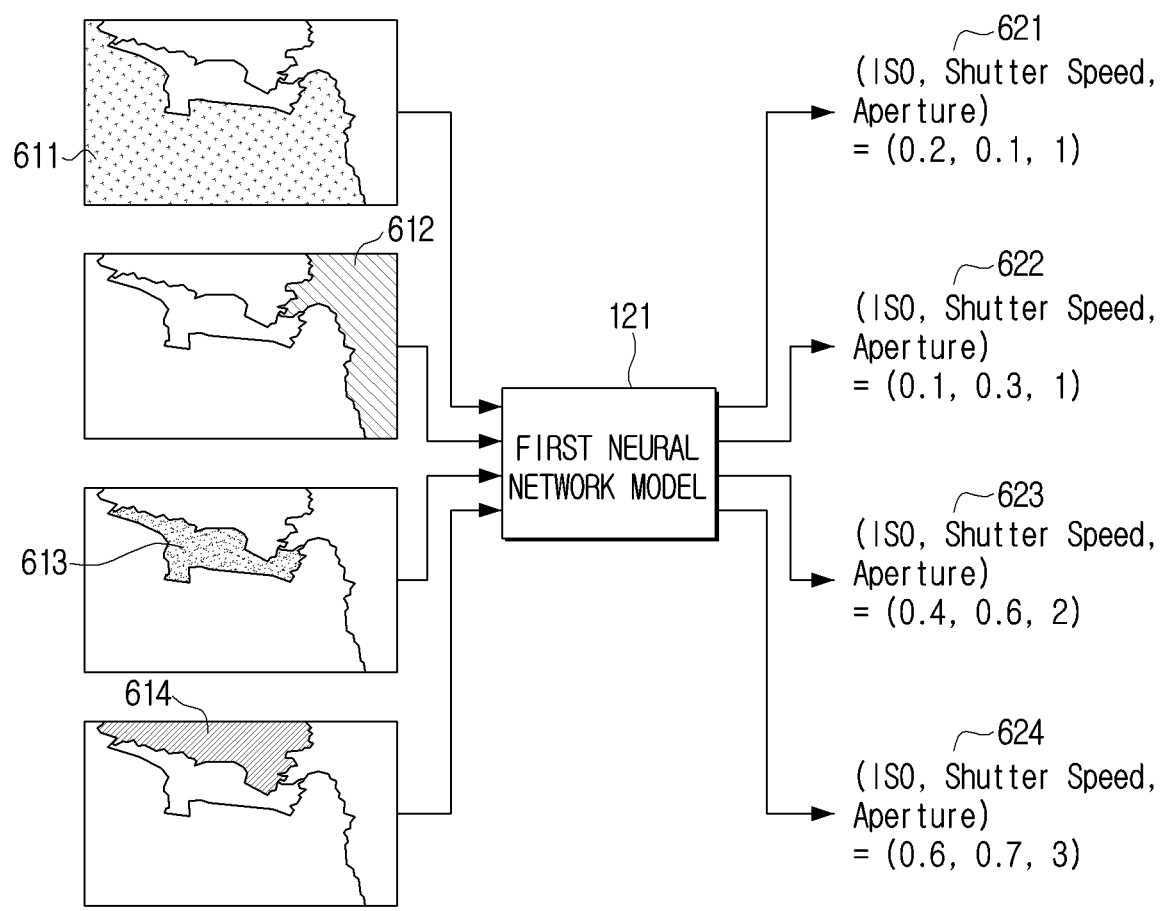
FIG. 6 is a diagram illustrating an example of a method for obtaining a plurality of first camera parameter setting value sets using a first neural network model according to an embodiment.

FIG. 6 is a diagram illustrating an example of a method for obtaining a plurality of first camera parameter setting value sets using a first neural network model according to an embodiment. Referring to FIG. 6, the electronic device 100 may obtain each of a plurality of first camera parameter setting value sets 621, 622, 623, and 624 by inputting each of a plurality of regions 611, 612, 613, and 614 to a first neural network model 121.

The camera parameter setting value set may include (ISO value, shutter speed value, aperture value). For example, a camera parameter setting value set corresponding to the region 611 may be (0.2, 0.1, 1) 621, a camera parameter setting value set corresponding to the region 612 may be (0.1, 0.3, 0.1) 622, a camera parameter setting value set corresponding to the region 613 may be (0.4, 0.6, 2) 623, and a camera parameter setting value set corresponding to the region 614 may be (0.6, 0.7, 3) 625.

The electronic device 100 may obtain a plurality of camera parameter setting value sets by inputting the plurality of first camera parameter setting value sets, image frames obtained through the camera 111, and the plurality of parameter values of the camera 111 to a second neural network model (S420).

The inputting of the image frame to the second neural network model herein may refer to inputting of pixel values (e.g., R, G, and B pixel values) of pixels included in the image frame.

Based on the camera parameter setting value set, the image frame, and the plurality of parameter values of the camera used for obtaining the image frame being input, the second neural network model may output information regarding an edge index, a contrast index, and a background index of an image frame corresponding to the input camera parameter setting value set.

Specifically, the second neural network model may estimate the edge index, the contrast index, and the background index of the image frame, when the camera obtains the input image frame using the input camera parameter setting value set, based on the input image frame and the plurality of parameter values used for obtaining the input image frame, and output information regarding the estimated edge index, contrast index, and background index.

In this case, the second neural network model may be, for example, a parameter estimation network. The second neural network model may be trained based on image frames obtained by capturing an image of a subject using various parameter values through a camera, parameter values used for obtaining the image frames, an image frame having a highest edge index, an image frame having a highest contrast index, and an image frame having a highest background index among the obtained image frames. However, this is merely an example, and the second neural network model may be trained by various methods.

Accordingly, the electronic device 100 may obtain information regarding an edge index, a contrast index, and a background index corresponding to each of the plurality of first camera parameter setting value sets, by inputting each of the plurality of first camera parameter setting value sets obtained from the first neural network model to the second neural network model together with the image frame and the plurality of parameter values of the camera 111 used for obtaining the image frame.

The electronic device 100 may select a plurality of camera parameter setting value sets among the plurality of first camera parameter setting value sets, based on information regarding the edge index, the contrast index, and the background index obtained from the second neural network model.

Specifically, the electronic device 100 may obtain a camera parameter setting value set with a maximum edge index, a camera parameter setting value set with a maximum contrast index, and a camera parameter setting value set with a maximum background index among the plurality of first camera parameter setting value sets, based on the information regarding the edge index, the contrast index, and the background index obtained from the second neural network model.

Figure 7:
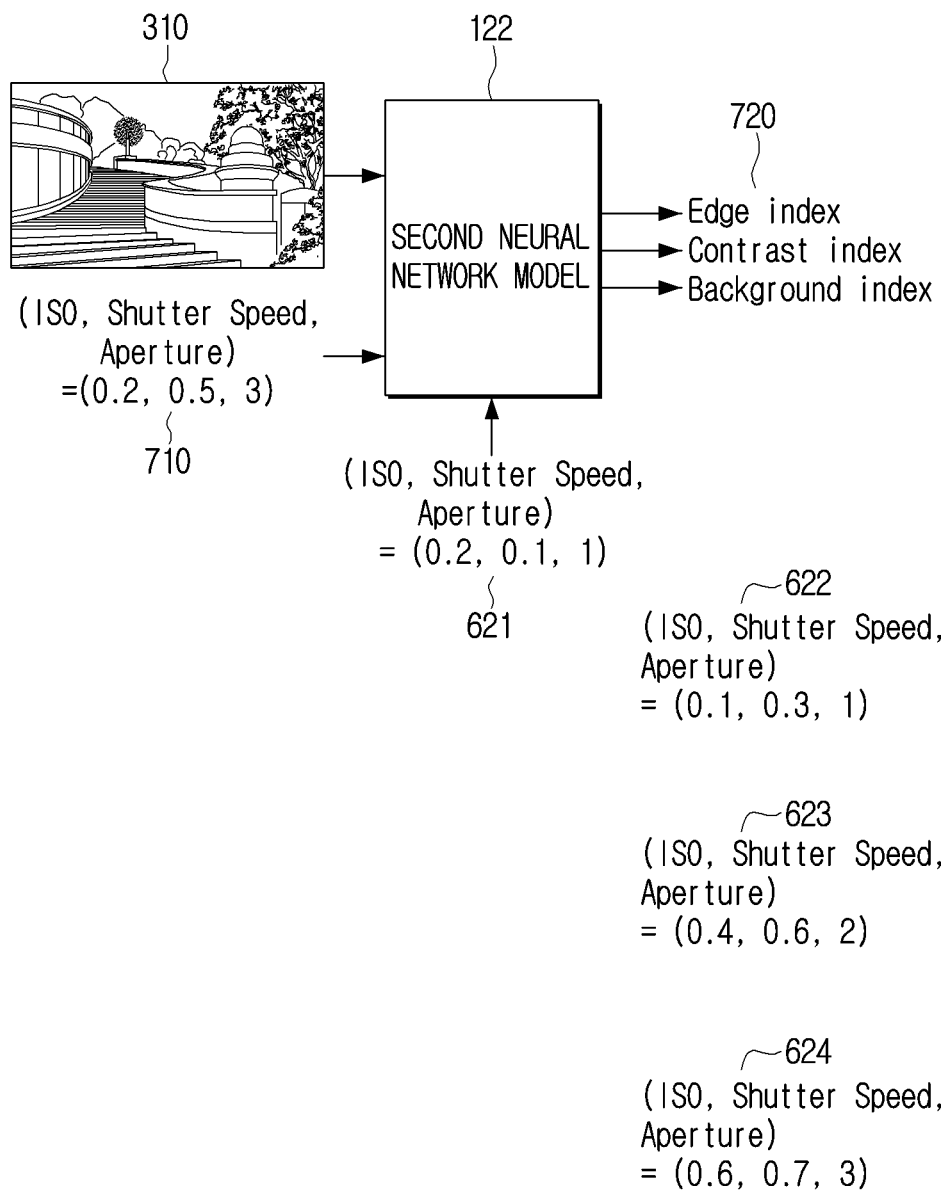
FIG. 7 is a diagram illustrating an example of a method for obtaining a plurality of camera parameter setting value sets using a second neural network model according to an embodiment.

FIG. 7 is a diagram illustrating an example of a method for obtaining a plurality of camera parameter setting value sets using a second neural network model according to an embodiment. Referring to FIG. 7, the electronic device 100 may select the camera parameter setting value set 621 among the plurality of first camera parameter setting value sets 621, 622, 623, and 624, and input an ISO value, a shutter speed value, and an aperture value included in the camera parameter setting value set (that is, (ISO, shutter speed, aperture)=(0.2, 0.1, 1)) 621, the image frame 310, and an ISO value, a shutter speed value, and an aperture value of the camera 111 used for obtaining the image frame 310 (that is, (ISO, shutter speed, aperture)=(0.2, 0.5, 3)) 710 to a second neural network model 122, to obtain information 720 regarding the edge index, the contrast index, and the background index corresponding to the camera parameter setting value set 621.

The electronic device 100 may obtain information regarding the edge index, the contrast index, and the background index corresponding to each of the camera parameter setting value sets 622, 623, and 624 by performing the above process with respect to the camera parameter setting value sets 622, 623, and 624.

When it is assumed that an edge index corresponding to the camera parameter setting value set 622 is highest among the obtained edge indexes, a contrast index corresponding to the camera parameter setting value set 623 is highest among the obtained contrast indexes, and a background index corresponding to the camera parameter setting value set 624 is highest among the obtained background indexes, the electronic device 100 may obtain the plurality of camera parameter setting value sets 622, 623, and 624 among the plurality of first camera parameter setting value sets 621, 622, 623, and 624.

As a result, the electronic device 100 may obtain the plurality of camera parameter setting value sets through the above method.

Referring back to FIG. 2, the electronic device 100 may receive a second user command for capturing the live view image (S250).

The capturing of the live view image may refer to obtaining an image frame corresponding to a timing of the user command for capturing being input, in order to store the image frame in the electronic device 100.

The storing the image frame in this case may be distinct from storing of image frames for the live view image in a volatile memory such as a frame buffer, and may imply that the image frame is stored in a non-volatile memory such as a flash memory of the electronic device 100. The image frame stored as described above may be displayed on the display of the electronic device 100 through a gallery application, if the gallery application is driven according to a user command.

The second user command may be, for example, a user command for selecting an image capturing button included in a user interface provided through a camera application. There is no limit to this example, and the second user command may be received in various manners such as, for example, based on a user touch input via the display of the electronic device 100, a user voice received via a microphone of the electronic device 100, an input via a physical button provided on the electronic device 100, a control signal transmitted by a remote control device for controlling the electronic device 100, and the like.

Based on the second user command for capturing the live view image being received (S250-Y), the electronic device 100 may obtain a plurality of image frames using the plurality of camera parameter setting value sets, and the camera among the plurality of cameras 111, 112, and 113 (S260).

For this, the electronic device 100 may identify a camera parameter setting value set corresponding to the camera among the plurality of camera parameter setting value sets.

Specifically, the electronic device 100 may identify a camera parameter setting value set including the same aperture value as the aperture value of the camera as a camera parameter setting value corresponding to the camera, based on the aperture values included in the plurality of camera parameter setting value sets and aperture values of the plurality of cameras 111, 112, and 113.

For example, it is assumed that the plurality of camera parameter setting value sets are (ISO, shutter speed, aperture)=(0.1, 0.3, 1), (0.4, 0.6, 2), and (0.6, 0.7, 3), an aperture value of the camera 111 is 1, an aperture value of the camera 112 is 2, and an aperture value of the camera 113 is 3.

In this case, the electronic device 100 may identify that (0.1, 0.3, 1) is a camera parameter setting value set corresponding to the camera 111, identify that (0.4, 0.6, 2) is a camera parameter setting value set corresponding to the camera 112, and identify that (0.6, 0.7, 3) is a camera parameter setting value set corresponding to the camera 113.

The electronic device 100 may set the ISO and the shutter speed of the camera 111 using (0.1, 0.3) identified as corresponding to the camera 111, and obtain an image frame through the camera 111 based on the set ISO value and shutter speed value of the camera 111. In addition, the electronic device 100 may set the ISO and the shutter speed of the camera 112 using (0.4, 0.6) identified as corresponding to the camera 112, and obtain an image frame through the camera 112 based on the set ISO value and shutter speed value of the camera 112. Further, the electronic device 100 may set the ISO and the shutter speed of the camera 113 using (0.6, 0.7) identified as corresponding to the camera 113, and obtain an image frame through the camera 113 based on the set ISO value and shutter speed value of the camera 113.

In this case, the electronic device 100 may obtain a plurality of image frames at the same timing through the plurality of cameras 111, 112, and 113. The same timing herein may include not only the completely same timing but also timing within a threshold time range.

As described above, the electronic device 100 may obtain a plurality of image frames using the plurality of camera parameter setting value sets and the plurality of cameras 111, 112, and 113.

In another example, the electronic device 100 may obtain an image frame using a first camera among the plurality of cameras 111, 112, and 113 and applying, to the first camera, one camera parameter setting value set among the plurality of camera parameter setting value sets, and may obtain at least two image frames using a second camera among the plurality of cameras 111, 112, and 113 and applying, to the second camera, at least two camera parameter setting value sets among the plurality of camera parameter setting value sets.

In other words, if the aperture values included in the at least two camera parameter setting value sets among the plurality of camera parameter setting value sets are the same as each other, the electronic device 100 may identify that the at least two camera parameter setting value sets having the same aperture value correspond to one camera, and obtain at least two image frames through the one camera using the at least two camera parameter setting value sets.

For example, it is assumed that the plurality of camera parameter setting value sets are (ISO, shutter speed, aperture)=(0.1, 0.3, 1), (0.9, 0.7, 1), and (0.8, 0.4, 2), the aperture value of the camera 111 is 1, the aperture value of the camera 112 is 2, and the aperture value of the camera 113 is 3.

In this case, the electronic device 100 may identify that (0.1, 0.3, 1) and (0.9, 0.7, 1) are camera parameter setting value sets of the camera 111 and identify that (0.8, 0.4, 2) is a camera parameter setting value set of the camera 112.

The electronic device 100 may set the ISO and the shutter speed of the camera 111 using (0.1, 0.3) corresponding to the camera 111 and obtain an image frame through the camera 111. In addition, the electronic device 100 may set the ISO and the shutter speed of the camera 111 using (0.9, 0.7) corresponding to the camera 111 and obtain an image frame through the camera 111.

Further, the electronic device 100 may set the ISO and the shutter speed of the camera 112 using (0.8, 0.4) corresponding to the camera 112 and obtain an image frame through the camera 112.

In this case, one of at least two image frames obtained through the camera 111 and an image frame obtained through the camera 112 may be obtained at the same timing. The same timing herein may include not only the completely same timing but also timing within a threshold time range.

As described above, the electronic device 100 may obtain a plurality of image frames using the plurality of camera parameter setting value sets and two cameras among the plurality of cameras 111, 112, and 113.

In another example, the electronic device 100 may obtain a plurality of image frames using a camera having the same aperture value as the aperture values included in the plurality of camera parameter setting value sets. In other words, if all of the aperture values included in the plurality of camera parameter setting value sets are the same as each other, the electronic device 100 may obtain a plurality of image frames using one camera having the same aperture value as the aperture values included in the plurality of camera parameter setting value sets.

For example, it is assumed that the plurality of camera parameter setting value sets are (0.1, 0.3, 1), (0.9, 0.7, 1), and (0.8, 0.4, 1), the aperture value of the camera 111 is 1, the aperture value of the camera 112 is 2, and the aperture value of the camera 113 is 3.

In this case, the electronic device 100 may identify that all of (0.1, 0.3, 1), (0.9, 0.7, 1), and (0.8, 0.4, 1) are camera parameter setting value sets of the camera 111.

The electronic device 100 may set the ISO and the shutter speed of the camera 111 using (0.1, 0.3) and obtain an image frame through the camera 111. In addition, the electronic device 100 may set the ISO and the shutter speed of the camera 111 using (0.9, 0.7) and obtain an image frame through the camera 111. Further, the electronic device 100 may set the ISO and the shutter speed of the camera 111 using (0.8, 0.4) and obtain an image frame through the camera 111.

Accordingly, the electronic device 100 may obtain a plurality of image frames using the plurality of camera parameter setting value sets and one camera among the plurality of cameras 111, 112, and 113.

In the above embodiments, the plurality of image frames obtained by the electronic device 100 may be Bayer raw data (or Bayer pattern data). In other words, in order to generate the image frame (e.g., image frame in which each of a plurality of pixels has R, G, and B pixel values (image frame with an RGB format)), the data obtained from the image sensor is subjected to a processing such as interpolation, but the Bayer raw data may be data not subjected to such processing.

Specifically, a pixel (or cell) of the image sensor included in the camera is a monochrome pixel, and accordingly, a color filter for transmitting only a specific color may be positioned on the pixel of the image sensor. The color filter may include an R filter for transmitting only R color, a G filter for transmitting only G color, or a B filter for transmitting only B color, and the color filters positioned on the pixels of the image sensor may refer to a color filter array. In the color filer array, the R, G, and B filters are disposed with a certain pattern. In an example, in a Bayer filter, a percentage of the G filter is 50%, a percentage of each of the R filter and the B filters is 25%, and a pattern in which two G filters and the R and B filters intersect each other may be provided.

As described above, one filter of the R, G, and B filters may be combined with one pixel of the image sensor, and one pixel may detect only one color of R, G, and B. In this case, the data generated by the pixels of the image sensor using the Bayer filter may refer to the Bayer raw data (hereinafter, referred to as a Bayer raw image). However, it is not limited to this example, and the data generated by the pixels of the image sensor is not limited to the Bayer raw data, and various types of color filter arrays may be used.

Figure 8:
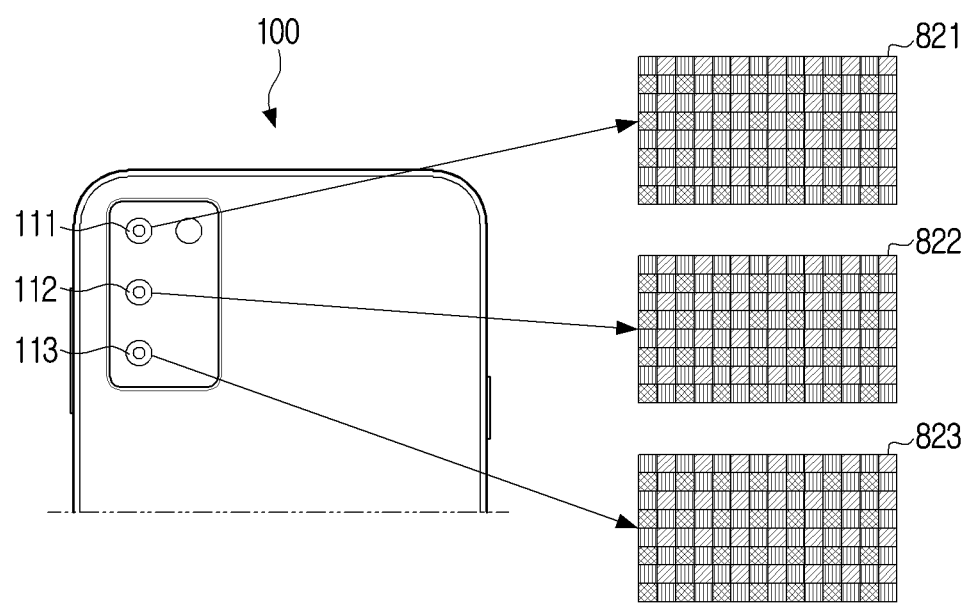
FIG. 8 is a diagram illustrating a plurality of image frames obtained using a plurality of cameras according to an embodiment.

FIG. 8 is a diagram illustrating a plurality of image frames obtained using a plurality of cameras according to an embodiment. Referring to FIG. 8, the electronic device 100 may obtain Bayer raw images 821, 822, and 823 using the plurality of cameras 111, 112, and 113, respectively, based on the second user command for capturing the live view image.

Therefore, the electronic device 100 may obtain a plurality of image frames based on the second user command for capturing through the above method.

Referring back to FIG. 2, the electronic device 100 may obtain an image frame corresponding to the second user command based on the plurality of image frames (S270).

In this case, the image frame may be stored in a non-volatile memory such as a flash memory of the electronic device 100 and then displayed on the display of the electronic device 100 through the gallery application driven based on the user command.

Each of the plurality of image frames may be the Bayer raw image as described above.

Figure 9:
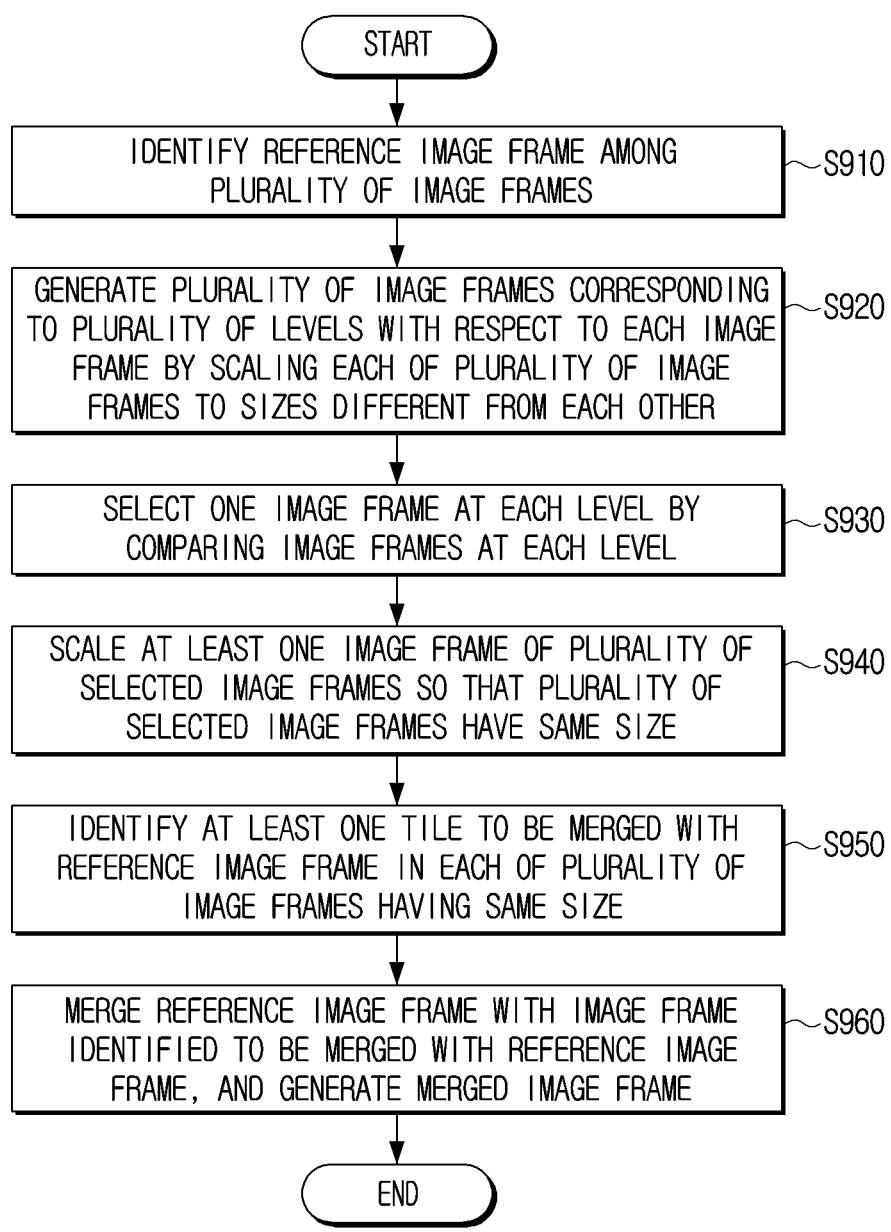
FIG. 9 is a flowchart illustrating a method for obtaining an image frame by merging a plurality of image frames according to an embodiment.

FIG. 9 is a flowchart illustrating a method for obtaining an image frame by merging a plurality of image frames according to an embodiment. Referring to FIG. 9, the electronic device 100 may select a reference image frame among the plurality of image frames (S910).

Specifically, the electronic device 100 may determine one of the plurality of image frames as the reference image frame based on the sharpness. In an example, the electronic device 100 may determine an image frame having a highest edge index as the reference image frame.

The electronic device 100 may generate a plurality of image frames corresponding to a plurality of levels with respect to each image frame by scaling each of the plurality of image frames to sizes different from each other (S920).

The generating of the image frames corresponding to the plurality of levels by scaling the image frames to sizes different from each other may refer to generating an image pyramid. The image pyramid may refer to an assembly of images obtained by scaling a base image to sizes different from each other.

A Gaussian pyramid is used as an example of the image pyramid. The Gaussian pyramid may include an assembly of images having sizes different from each other generated by repeatedly performing blurring and subsampling (or downsampling) with respect to an image. In this case, a Gaussian filter may be used for the blurring. In addition, resolution of an image may be reduced by performing subsampling through a method for removing pixels included in even-numbered columns and even-numbered rows of an image.

For example, an image at a level 1 may be generated by performing the blurring and the subsampling with respect to an image at a level 0 (e.g., base image). In this case, the image at the level 1 may have a resolution that is ½ of that of the base image. In addition, an image at a level 2 may be generated by performing the blurring and the subsampling with respect to the image at the level 1. In this case, the image at the level 2 may have a resolution that is ¼ of that of the base image. Such a method may be performed in a stepwise manner to generate the Gaussian pyramid including images corresponding to a plurality of levels.

In other words, the electronic device 100 may set each of the plurality of image frames as a base image and generate a plurality of Gaussian pyramids of the plurality of image frames. In this case, the Gaussian pyramid may include image frames corresponding to the plurality of levels.

The electronic device 100 may select one image frame at each level by comparing the image frames at each level (S930).

Specifically, the electronic device 100 may select an image frame having a smallest difference between image frames among the plurality of image frames included at each level. In other words, the electronic device 100 may calculate, for each image frame, a difference in pixel values between an image frame and other image frames included at the same level as the image frame, and select an image frame having a smallest calculated difference at each level.

Figure 10:
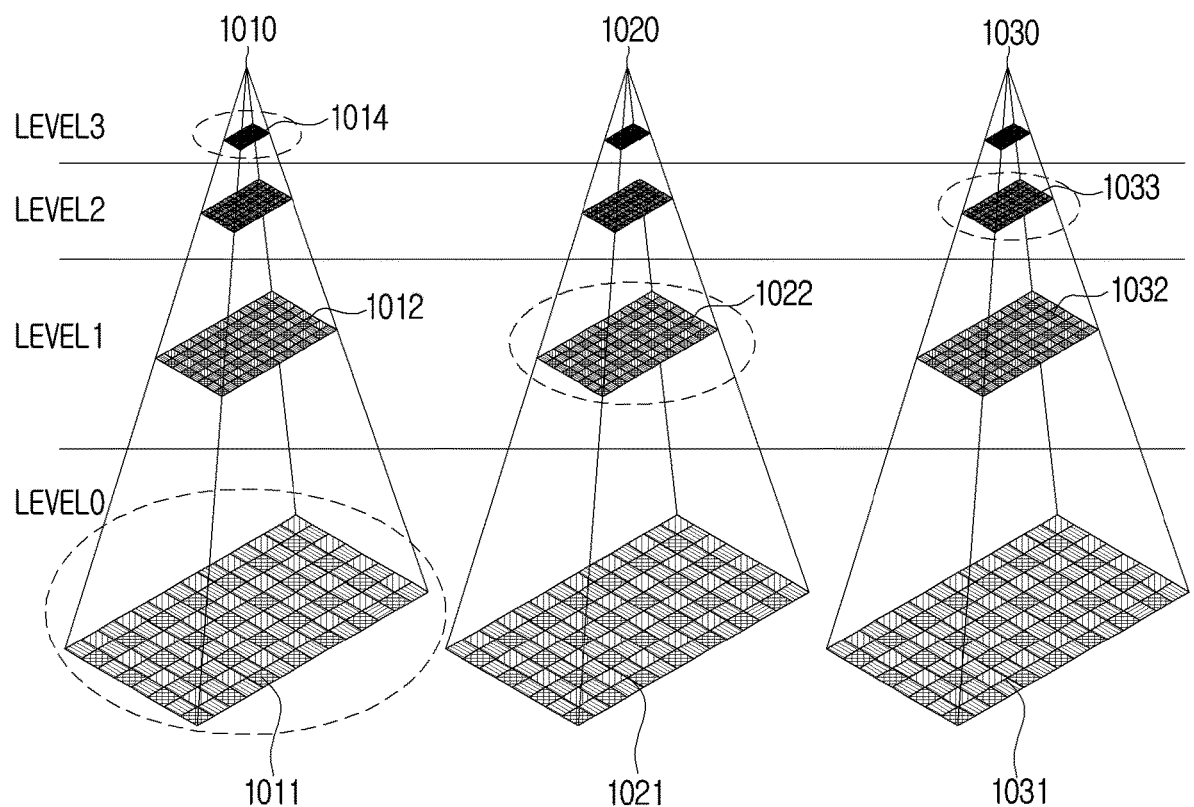
FIG. 10 is a diagram illustrating a plurality of Gaussian pyramids according to an embodiment.

FIG. 10 is a diagram illustrating a plurality of Gaussian pyramids according to an embodiment. As illustrated in FIG. 10, a plurality of Gaussian pyramids 1010, 1020, and 1030 regarding a plurality of image frames 1011, 1021, and 1031 may be generated. FIG. 10 illustrates that the Gaussian pyramid having four levels is generated, but the disclosure is not limited to this example, and the Gaussian pyramid may include images at various levels.

In this case, the electronic device 100 may identify the image frame 1011 having a smallest difference in pixel values among the plurality of image frames 1011, 1021, and 1031 at a level 0. In addition, the electronic device 100 may identify an image frame 1022 having a smallest difference in pixel values among a plurality of image frames 1012, 1022, and 1032 at a level 1. The electronic device 100 may perform such a process at a level 2 and a level 3 to identify an image frame 1033 having a smallest difference in pixel values at the level 2 and identify an image frame 1014 having a smallest difference in pixel values at the level 3.

As described above, the electronic device 100 may select the plurality of image frames 1011, 1022, 1033, and 1014 at the plurality of levels.

Then, the electronic device 100 may scale at least one image frame of the plurality of selected image frames so that the plurality of selected image frames have the same size (S940).

In this case, the electronic device 100 may perform upsampling of remaining image frames excluding an image frame used as a base image so as to have the same size as the image frame used as the base image when generating the Gaussian pyramid.

The electronic device 100 may identify at least one tile to be merged with a reference image frame in each of the plurality of image frames having the same size (S950).

For this, the electronic device 100 may perform tiling of the reference image frame and each of the plurality of image frames having the same size. The tiling may mean that the image frame is divided into a plurality of regions. In this case, each region may be referred to as a tile and a size of the tile may be smaller than the size of the image frame.

The electronic device 100 may identify at least one tile to be merged with tiles of the reference image frame among tiles of each of the plurality of image frames.

Specifically, the electronic device 100 may identify at least one tile having a difference from the tiles of the reference image frame that is equal to or less than a preset threshold value, among tiles of any given image frame. In this case, the electronic device 100 may apply a Laplacian filter to the reference image frame and the image frames, identify a difference between the tiles of the reference image frame, to which the Laplacian filter is applied, and the tiles of the image frames, to which the Laplacian filter is applied, and identify at least one tile having a difference equal to or less than a preset threshold value among the tiles of each image frame. The preset threshold value herein may be, for example, 5%.

Figure 11:
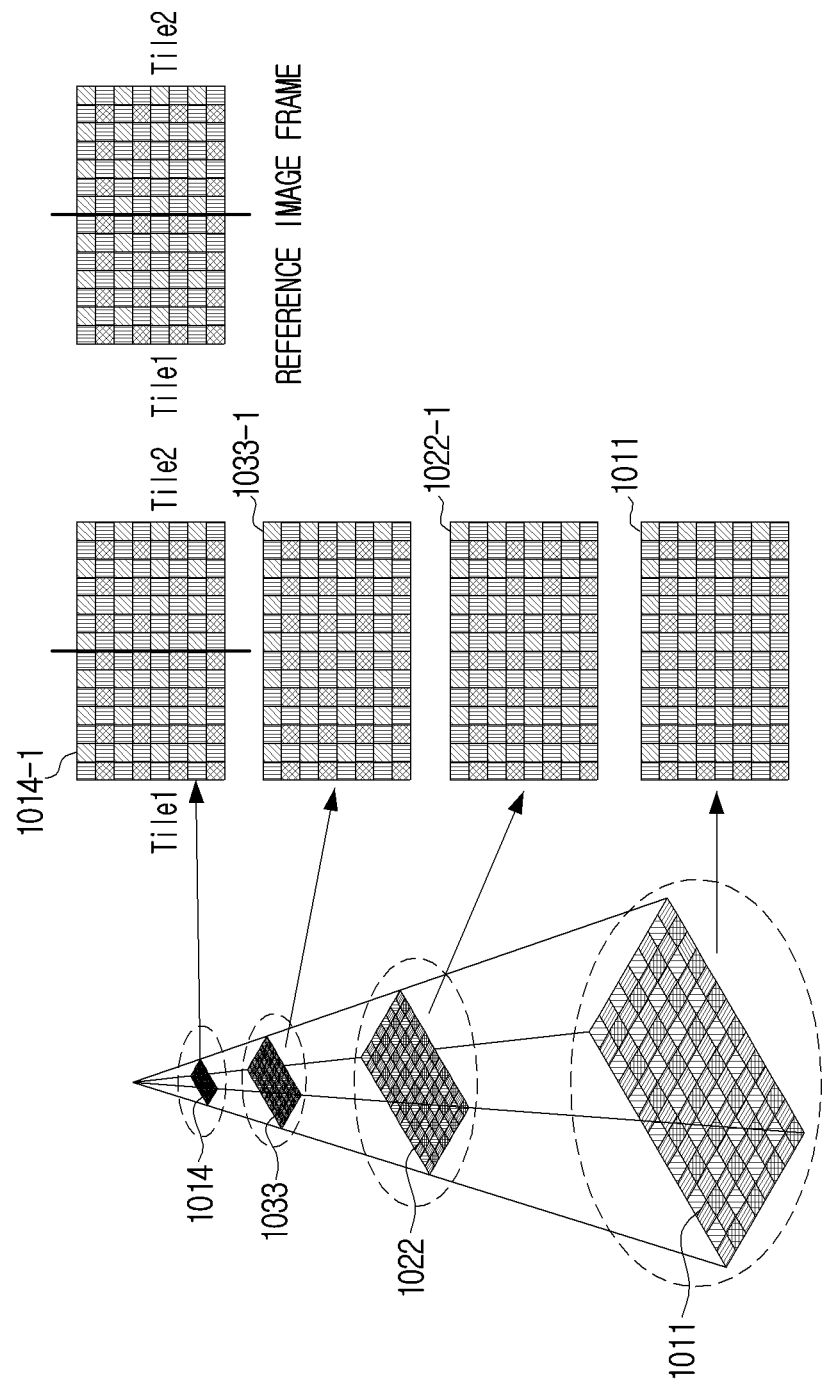
FIG. 11 is a diagram illustrating a method for merging a plurality of image frames according to an embodiment.

FIG. 11 is a diagram illustrating a method for merging a plurality of image frames according to an embodiment. Referring to FIG. 11, image frames 1022-1, 1033-1, and 1014-1 having the same size as the image frame 1011 may be generated by scaling the image frames 1022, 1033, and 1014 that are selected among the plurality of image frames at the plurality of levels.

The electronic device 100 may calculate a difference between a tile 1 of the image frame 1014-1, to which the Laplacian filter is applied, and a tile 1 of the reference image frame, to which the Laplacian filter is applied, and if the calculated difference is equal to or less than the preset threshold value, the electronic device 100 may identify the tile 1 of the image frame 1014-1 as an image frame to be merged with the tile 1 of the reference image frame. In addition, the electronic device 100 may calculate a difference between a tile 2 of the image frame 1014-1, to which the Laplacian filter is applied, and a tile 2 of the reference image frame, to which the Laplacian filter is applied, and if the calculated difference is equal to or less than the preset threshold value, the electronic device 100 may identify the tile 2 of the image frame 1014-1 as an image frame to be merged with the tile 2 of the reference image frame. The electronic device 100 may identify image frames to be merged with the tiles 1 and 2 of the reference image frame by performing the above process with respect to the image frames 1011, 1022-1, and 1033-1. FIG. 11 illustrates that the image frame is divided into two tiles. However, it is not limited to this example, and the image frame may be divided into three or more tiles.

The electronic device 100 may merge the reference image frame with the image frame identified to be merged with the reference image frame, and generate the merged image frame (S960).

Specifically, the electronic device 100 may convert the reference image frame (or tile of the reference image frame) and the image frame to be merged (or tile of the image frame to be merged) into a frequency domain using discrete Fourier transform (DFT), and merge the image frames (or tiles of the image frame) on the frequency domain.

If an image frame I(x,y) (x and y herein are coordinate values of a pixel) is represented by $T(w_x,w_y)$ on the frequency domain, the electronic device 100 may merge the image frames on the frequency domain using Mathematic Expression 2 below.

[Mathematic Expression 2]
$$T_0(w_x, w_y) = \frac{1}{N}\sum_{z=0}^{N-1}[T_z(w_x, w_y) + K_z(T_r(w_x, w_y) - T_z(w_x, w_y))]$$

Here, $T_o(w_x,w_y)$ is a merged image frame, to which the discrete Fourier transform is applied, $T_r(w_x,w_y)$ is a reference image frame, to which the discrete Fourier transform is applied, $T_z(w_x,w_y)$ is an image frame to be merged, to which the discrete Fourier transform is applied, and $K_z$ corresponds to a proportional factor determined based on a difference in average pixel value between the reference image frame and the image frame to be merged with the reference image frame.

In addition, the electronic device 100 may convert the merged frame image into an image domain using inverse Fourier transform. In other words, the electronic device 100 may convert $T_o(w_x,w_y)$ into the image domain using the inverse Fourier transform and generate the merged image frame $I_o(x,y)$.

According to an embodiment, the resolutions of at least two cameras among the plurality of cameras may be different from each other. Accordingly, the sizes of at least two image frames among the plurality of image frames obtained by the electronic device 100 according to the second user command for capturing the live view image may be different from each other.

In this case, the electronic device 100 may crop at least one image frame among the plurality of image frames so that the plurality of image frames have the same size, before generating the plurality of Gaussian pyramids. Accordingly, the plurality of image frames used as the reference image for generating the plurality of Gaussian pyramids may have the same size.

The above merging process may be performed with respect to the Bayer raw image, and accordingly, the merged image frame on the image domain may also be the Bayer raw image.

In this case, the electronic device 100 may generate an image frame (e.g., image frame in which each of a plurality of pixels has R, G, and B pixel values (image frame in RGB format)) based on the merged image frame.

Herein, the electronic device 100 may obtain the image frame using a neural network model. The third neural network model may be conditional generative adversarial networks (cGAN). The conditional GAN(cGAN) may include a generator and a discriminator. In this case, the generator and the discriminator may be trained in an adversarial manner.

The generator may generate and output an image frame in which each of a plurality of pixels has R, G, and B pixel values correspond to the input Bayer raw image.

Input data x of the generator for training of cGAN may be a Bayer raw image obtained by the image sensor of the camera when a user captured an image through the camera using various parameter values, and output data y of the generator may be an image frame (e.g., image frame in JPEG format) obtained by performing a process such as interpolation with respect to the Bayer raw image.

In this case, an output G(x) of the generator may be obtained by inputting the input data x and noise data to the generator.

In addition, a pair of (input data x, output data y) (hereinafter, referred to as real pair data) and a pair of (input data x, G(x)) (hereinafter, referred to as fake pair data) may be input to the discriminator. The discriminator may output probability values regarding whether the real pair data and the fake pair data are real or fake, respectively.

If an output of the discriminator regarding the input real pair data is defined as D(x,y) and an output of the discriminator regarding the input fake pair data is defined as D(x, G(x)), a loss $L_G^{CGAN}$ of the generator may be represented by Mathematical Expression 3 below, and a loss $L_G^{CGAN}$ of the discriminator may be represented by Mathematical Expression 4 below.

$$L_G^{CGAN} = E[\log(D(x,G(x)))] + \lambda_1 L_1[G(x),y] + \lambda_2 L_2[G(x),y] + \lambda_3 \alpha T_{batch}$$ [Mathematical Expression 3]

$$L_D^{CGAN} = [\log(D(x,y))] + E[\log(1-D(x,G(x)))]$$ [Mathematical Expression 4]

Herein, $\lambda_1$, $\lambda_2$, and $\lambda_3$ are hyper parameters.

$L_1[G(x),y]$ is a loss of sharpness between the output G(x) and the output data y of the generator and may indicate a difference in pixel values as $|G(x)-y|$. In addition, $L_2[G(x),y]$ is a loss of pixel values between the output G(x) and the output data y of the generator and may be represented by $$\sum_{i=1}^{n}(G(x)_i - y_i)^2$$

(herein, i=1, 2, 3, . . . , n (n is a total pixel number)).

In addition, $\alpha$ is a number of downsampling layers of the generator and $T_{batch}$ corresponds to an average processing time for each batch. As described above, the loss is calculated based on $\alpha$, because the processing performance of the electronic device, in which the model is used, is useful for determining an appropriate number of layers of the model. In this case, when the processing performance of the electronic device is sufficiently high (e.g., high end electronic device), a calculation speed is high, and accordingly, a large number of layers may be used. When the processing performance of the electronic device is not sufficiently high (e.g., low end electronic device), a small number of layers may be used.

In this case, the discriminator may be trained so that the loss $L_D^{CGAN}$ of the discriminator is maximized, and the generator may be trained so that the loss $L_G^{CGAN}$ of the generator is minimized.

Accordingly, the electronic device 100 may obtain the image frame by inputting the merged image frame to the third neural network model. In addition, the electronic device 100 may store the obtained image frame in a non-volatile memory such as a flash memory of the electronic device 100.

Here, the image frame may be an image frame in which each of a plurality of pixels has R, G, and B pixel values. In this case, the image frame may have the same size as the merged image frame.

Figure 12:
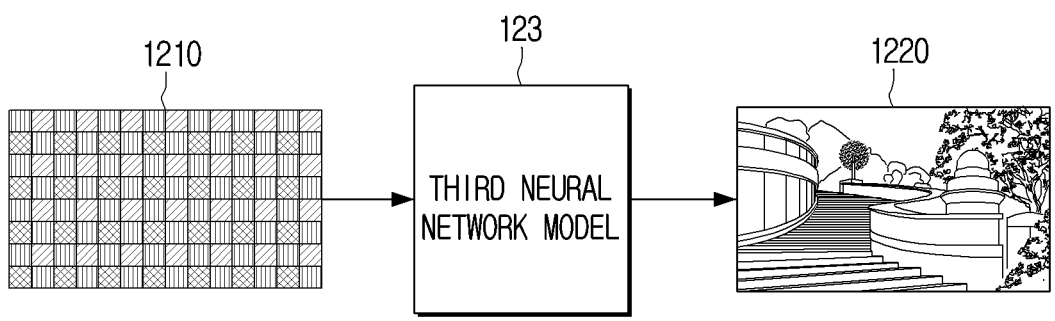
FIG. 12 is a diagram illustrating a method for obtaining an image frame using a third neural network model according to an embodiment.

FIG. 12 is a diagram illustrating a method for obtaining an image frame using a third neural network model according to an embodiment. Referring to FIG. 12, the electronic device 100 may obtain an image frame 1220 by inputting a merged image frame 1210 to a third neural network model 123. In this case, the electronic device 100 may obtain the image frame 1220 by inputting only the merged image frame 1210 to the third neural network model 123, without inputting separate noise data to the third neural network model 123. This is because that, in the disclosure, a merged image frame is generated by merging a plurality of image frames with different attributes, and during this process, it is considered that the merged image frame ensured a certain degree of randomness. However, this is merely an example, and the electronic device 100 may input the noise data and the merged image frame 1210 to the third neural network model 123.

In the disclosure, the image frame obtained from the third neural network model 123 may be an image frame subjected to at least one of black level adjustment, color correction, gamma correction, or edge enhancement.

Here, the black level adjustment may refer to image processing for adjusting a black level of a pixel included in the Bayer raw image. When generating the image frame by performing interpolation with respect to the Bayer raw image, a distortion may occur when expressing the color, and the color correction may refer to image processing for correcting such a distortion. The gamma correction may refer to image processing for nonlinearly transforming an intensity signal of light using a nonlinear transfer function with respect to an image. The edge enhancement may refer to image processing for highlighting an edge to an image.

For this, the generator may have a U-net (U-shaped network) structure. The U-net may refer to a neural network capable of extracting a feature of an image frame such as an edge and the like using both low-order and high-order information. In the disclosure, when the image frame generated by the generator is identified as a real image frame based on the output of the discriminator, the generator may perform a filtering operation through each layer of the U-net and perform at least one of the black level adjustment, the color correction, the gamma correction, or the edge enhancement of the image frame.

As described above, according to an embodiment of the disclosure, the electronic device 100 may obtain an image frame based on the second user command for capturing the live view image.

According to the disclosure described above, a plurality of camera parameter setting value sets corresponding to a plurality of regions obtained from an image frame may be obtained, a plurality of image frames may be obtained using camera parameter setting value sets selected from the plurality of camera parameter setting value sets based on image indexes, and the obtained image frames may be merged to obtain an image frame corresponding to a user command for capturing. Therefore, a high-quality image frame may be generated, an image frame with comparatively sharp edge of regions having brightness different from each other in the image frame may be obtained, a patch phenomenon (e.g., horizontal line of sky background) is hardly observed, and a ghosting phenomenon may also be reduced.

In the above embodiments, the neural network model may refer to an artificial intelligence model including a neural network and may be trained by deep learning. For example, the neural network model may include at least one artificial neural network model among a deep neural network (DNN), a convolution neural network (CNN), a recurrent neural network (RNN), and generative adversarial networks (GAN). However, the neural network model according to the disclosure is not limited to the above examples.

In addition, according to an embodiment of the disclosure, the obtaining of the image frame by the electronic device 100 through the above method may be performed in a low light mode (e.g., low light photography).

Specifically, if the light intensity is less than a preset threshold value, the electronic device 100 may activate the low light mode and obtain an image frame in the low light mode through the method described above. The light intensity here may be calculated based on brightness of pixels included in the image frame obtained through the camera for the live view image. However, the disclosure is not limited to this example, the electronic device 100 may measure surrounding brightness using a illuminance sensor of the electronic device 100, and if the measured surrounding brightness is less than a preset threshold value, the electronic device may activate the low light mode. The image frame obtained in the low light mode has poor quality due to blur, noise, and uneven contrast. Accordingly, in the disclosure, an enhanced image frame may be obtained in the low light mode through the method described above. However, the disclosure is not limited to this example, and the electronic device 100 may obtain the image frame through the above method, even if the low light mode is not activated.

In addition, in the above embodiments, it is described that the first neural network model 121 outputs the camera parameter setting value set corresponding to each of the plurality of regions, but the disclosure is not limited to this example. In another example, the first neural network model 121 may additionally generate a plurality of camera parameter setting value sets by combining camera parameter setting value sets corresponding to at least two regions, and output the camera parameter setting value sets respectively corresponding to of the plurality of regions and the plurality of camera parameter setting value sets generated in combination.

The combining of the camera parameter setting value sets may refer to changing parameter values of the same parameter included in the camera parameter setting value sets.

Specifically, the first neural network model 121 may identify camera parameter setting value sets having the same aperture value among the plurality of camera parameter setting value sets respectively corresponding to the plurality of regions, changing an ISO value included in one of the identified camera parameter setting value sets with an ISO value included in another one of the identified camera parameter setting value sets, or changing a shutter speed value included in one of the identified camera parameter setting value sets with a shutter speed value included in another one of the identified camera parameter setting value sets, and generate a plurality of camera parameter setting value sets based on the changed camera parameter setting value sets.

Figure 13:
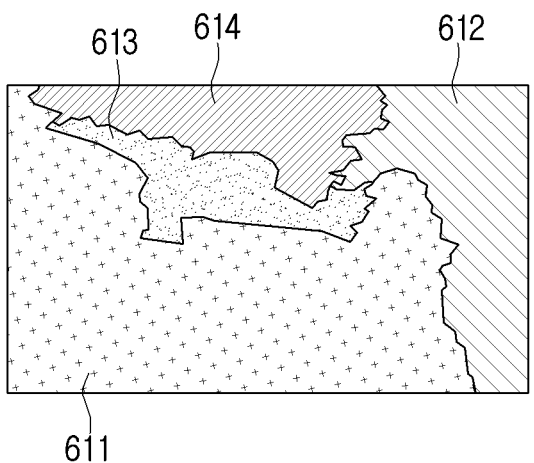
FIG. 13 is a diagram illustrating an example of a method for obtaining a plurality of camera parameter setting value sets using a first neural network model according to an embodiment.

FIG. 13 is a diagram illustrating an example of a method for obtaining a plurality of camera parameter setting value sets using a first neural network model according to an embodiment. Referring to FIG. 13, as described in the example with reference to FIG. 6, the first neural network model 121 may generate camera parameter setting value sets 621, 622, 623, and 624 based on each of a plurality of regions 611, 612, 613, and 614.

Herein, the camera parameter setting value set 621 corresponding to the region 611 and the camera parameter setting value set 622 corresponding to the region 612 have the same aperture value (i.e., the aperture value of 1).

In this case, the first neural network model 121 may generate camera parameter setting value sets 625 and 626 by changing the shutter speed values of the camera parameter setting value set 621 and the camera parameter setting value set 622. Specifically, the first neural network model 121 may generate the camera parameter setting value set 625 by changing a shutter speed value included in the camera parameter setting value set 621 to a shutter speed value included in the camera parameter setting value set 622, and generate the camera parameter setting value set 626 by changing the shutter speed value included in the camera parameter setting value set 622 to the shutter speed value included in the camera parameter setting value set 621.

Accordingly, the first neural network model 121 may output the plurality of camera parameter setting value sets 621, 622, 623, 624, 625, and 626. In this case, the electronic device 100 may obtain a plurality of camera parameter setting value sets by inputting the plurality of camera parameter setting value sets obtained from the first neural network model 121 to the second neural network model 122. The subsequent operation is the same as the above embodiment, and therefore the specific overlapped description will not be repeated.

In addition, in the above embodiments, the electronic device 100 obtained the plurality of camera parameter setting value sets used for capturing the live view image by using the second neural network model 122. However, the disclosure is not limited to this example, and the electronic device 100 may generate an image frame corresponding to the second user command for capturing the live view image by using the plurality of camera parameter setting value sets obtained from the first neural network model 121. Specifically, the electronic device 100 may identify a camera parameter setting value set corresponding to a camera based on an aperture value included in each of the plurality of camera parameter setting value sets obtained from the neural network model 121 and aperture values of the plurality of cameras 111, 112, and 113, and obtain a plurality of image frames using the plurality of camera parameter setting value sets and at least one camera.

In addition, in the above embodiments, it is described that the electronic device 100 obtains the plurality of camera parameter setting value sets using the neural network model (e.g., the first and second neural network models 121 and 122). However, there is no limitation thereto, and the electronic device 100 may also obtain the plurality of camera parameter setting value sets based on a rule.

Specifically, the electronic device 100 may identify pixel values of pixels included in each of the plurality of regions, and obtain a plurality of camera parameter setting value sets based on the identified pixel values and a predefined rule.

In this case, the electronic device 100 may use a rule-based engine. The rule-based engine may analyze input data based on predefined rules and output a result thereof.

In the disclosure, the obtaining of the plurality of camera parameter setting value sets based on a rule may include obtaining a plurality of camera parameter setting value sets used for capturing the image frame based on the rule.

Figure 14:
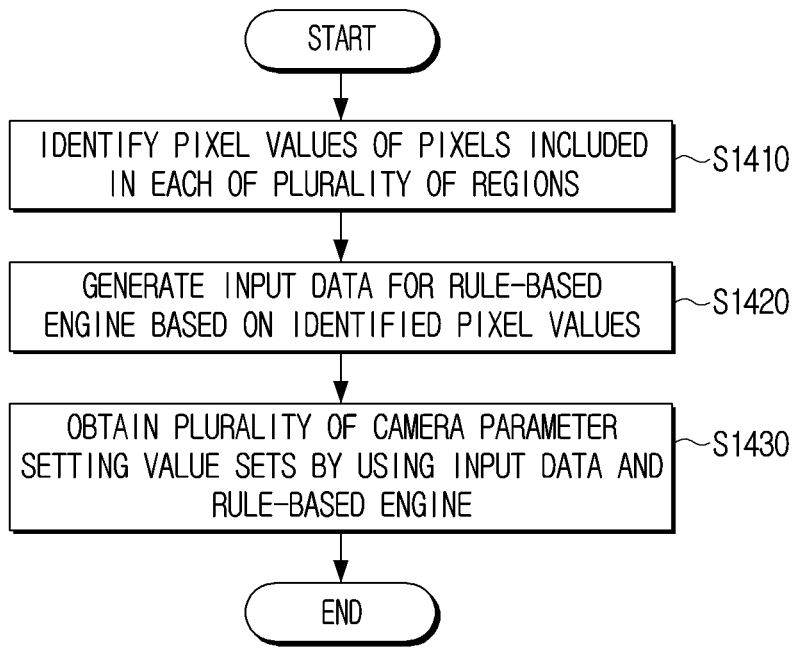
FIG. 14 is a flowchart illustrating an example of a method for obtaining a plurality of camera parameter setting value sets using a rule according to an embodiment.

FIG. 14 is a flowchart illustrating an example of a method for obtaining a plurality of camera parameter setting value sets using a rule according to an embodiment. First, as illustrated in FIG. 14, the electronic device 100 may identify pixel values of pixels included in each of the plurality of regions (S1410), and generate input data for the rule-based engine based on the identified pixel values (S1420).

The input data herein may include at least one of pixel values of pixels included in each region, an average of pixel values, a dispersion, or a deviation.

The electronic device 100 may obtain a plurality of camera parameter setting value sets by inputting the generated input data to the rule-based engine (S1430).

Specifically, the electronic device 100 may input the generated input data regarding each region to the rule-based engine. In the disclosure, if the generated input data of the region satisfies a predefined first rule, the rule-based engine may determine a camera parameter setting value set corresponding to the region according to the first rule, and if the plurality of camera parameter setting value sets determined regarding the plurality of regions satisfy a predefined second rule, the rule-based engine may determine and output the plurality of camera parameter setting value sets for capturing the image frame among the plurality of camera parameter setting value sets according to the second rule.

In addition, in the disclosure, the obtaining the plurality of camera parameter setting value sets based on the rule may include obtaining a camera parameter setting value set corresponding to each region based on the rule.

Figure 15:
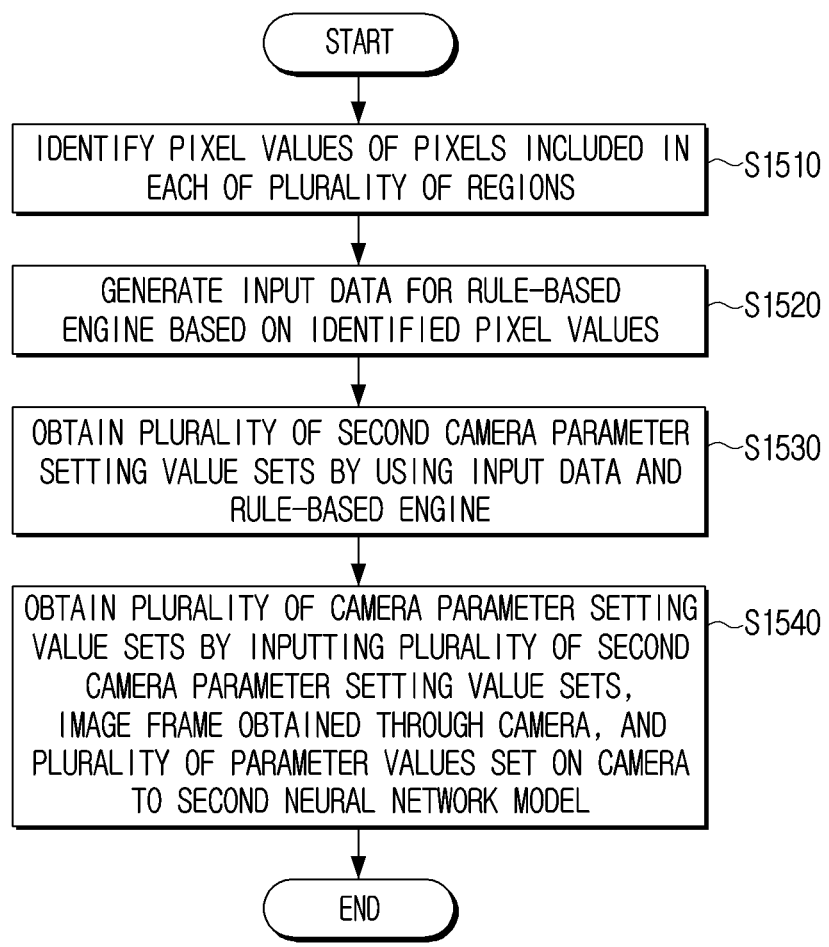
FIG. 15 is a flowchart illustrating an example of a method for obtaining a plurality of camera parameter setting value sets using a rule according to an embodiment.

FIG. 15 is a flowchart illustrating an example of a method for obtaining a plurality of camera parameter setting value sets using a rule according to an embodiment. First, as illustrated in FIG. 15, the electronic device 100 may identify pixel values of pixels included in each of the plurality of regions (S1510), and generate input data for the rule-based engine based on the identified pixel values (S1520).

Herein, the input data may include at least one of pixel values of pixels included in each region, an average of pixel values, a dispersion, or a deviation.

The electronic device 100 may obtain a plurality of second camera parameter setting value sets by inputting the generated input data to the rule-based engine (S1530).

Specifically, the electronic device 100 may input the generated input data of each region to the rule-based engine. In the disclosure, if the generated input data of the region satisfies a predefined rule, the rule-based engine may determine a camera parameter setting value set corresponding to the region according to the rule, and output the plurality of second camera parameter setting value sets determined with respect to the plurality of regions.

The electronic device 100 may obtain a plurality of camera parameter setting value sets used for capturing the image frame by inputting the plurality of second camera parameter setting value sets to the second neural network model 122. Specifically, the electronic device 100 may obtain the plurality of camera parameter setting value sets for capturing the image frame by inputting the plurality of second camera parameter setting value sets, the image frame obtained through the camera 111, and the plurality of parameter values set on the camera 111 to the second neural network model 122 (S1540).

In addition, in the above embodiments, it is described that the image indexes include the edge index, the contrast index, and the background index. However, the disclosure is not limited to this example, and the image indexes may include various indexes related to quality of the image frame.

In addition, the image indexes may include at least one of the edge index, the contrast index, or the background index. In this case, even in the training process of the first neural network model 121, the enhancement ratio may be calculated based on the at least one index of the region and the first neural network model 121 may be trained by using the enhancement ratio. In addition, with respect to the input camera parameter setting value set, the second neural network model 122 may output information regarding the at least one index of the image frame corresponding to the input camera parameter setting value sets.

The electronic device 100 may select at least one camera parameter setting value set among the plurality of first camera parameter setting value sets based on the information obtained from the second neural network model 122. Based on the second user command for capturing the live view image being received, the electronic device 100 may obtain the image frame using the selected at least one camera parameter setting value set and at least one camera of the plurality of cameras 111, 112, and 113.

In addition, in the above embodiments, it is described that the electronic device 100 includes the three cameras 111, 112, and 113. However, there is no limitation thereto, and the electronic device 100 may include at least one camera.

Further, in the above embodiments, it is described that the number of plurality of cameras 111, 112, and 113 of the electronic device 100 is the same as the number of the plurality of camera parameter setting value sets used for capturing the live view image. However, there is no limitation thereto.

According to an embodiment, the number of cameras of the electronic device 100 may be smaller than the number of the plurality of camera parameter setting value sets.

In this case, the electronic device 100 may obtain a plurality of image frames by using at least two camera parameter setting value sets, among the plurality of camera parameter setting value sets, to be applied to one camera several times. For example, when using one camera for capturing the live view image, the electronic device 100 may obtain the plurality of image frames using the plurality of camera parameter setting value sets on one camera. In another example, when using two cameras for capturing the live view image, the electronic device 100 may obtain a plurality of image frames using at least two camera parameter setting value sets among the plurality of camera parameter setting value sets on one camera and obtain one image frame using the remaining one camera parameter setting value set on another camera.

In these cases, the camera for obtaining the plurality of image frames may obtain the image frame using the plurality of parameter values included in one camera parameter setting value set, and then obtain an image frame using the plurality of parameter values included in another camera parameter setting value set.

According to an embodiment, the number of cameras of the electronic device 100 may be larger than the number of the plurality of camera parameter setting value sets. In this case, the electronic device 100 may obtain a plurality of image frames using the plurality of camera parameter setting value sets and at least one camera among the plurality of cameras.

In addition, in the above embodiments, the electronic device 100 obtains the image frame by inputting the merged image frame to the third neural network model 123. However, there is no limitation thereto, and the electronic device 100 may obtain the image frame (that is, image frame in which each of a plurality of pixels has R, G, and B pixel values (image frame with an RGB format)) by performing interpolation, black level adjustment, color correction, comma correction, edge enhancement, and the like of the merged image frame, without using the third neural network model 123.

In addition, in the above embodiments, the electronic device 100 obtains the plurality of Bayer raw images and merges the plurality of Bayer raw images based on the second user command for capturing the live view image. However, there is no limitation thereto, and the electronic device 100 may obtain a plurality of image frames (that is, image frames in which each of a plurality of pixels has R, G, and B pixel values (image frames with an RGB format)), and obtain an image frame corresponding to the second user command for capturing the live view image by merging the obtained image frames.

In addition, in the above embodiments, the electronic device 100 merges the plurality of image frames to generate the merged image frame. In this case, the electronic device 100 may remove noise from the plurality of image frames by using a temporal filter and merge the plurality of image frames from which the noise is removed.

Figure 16:
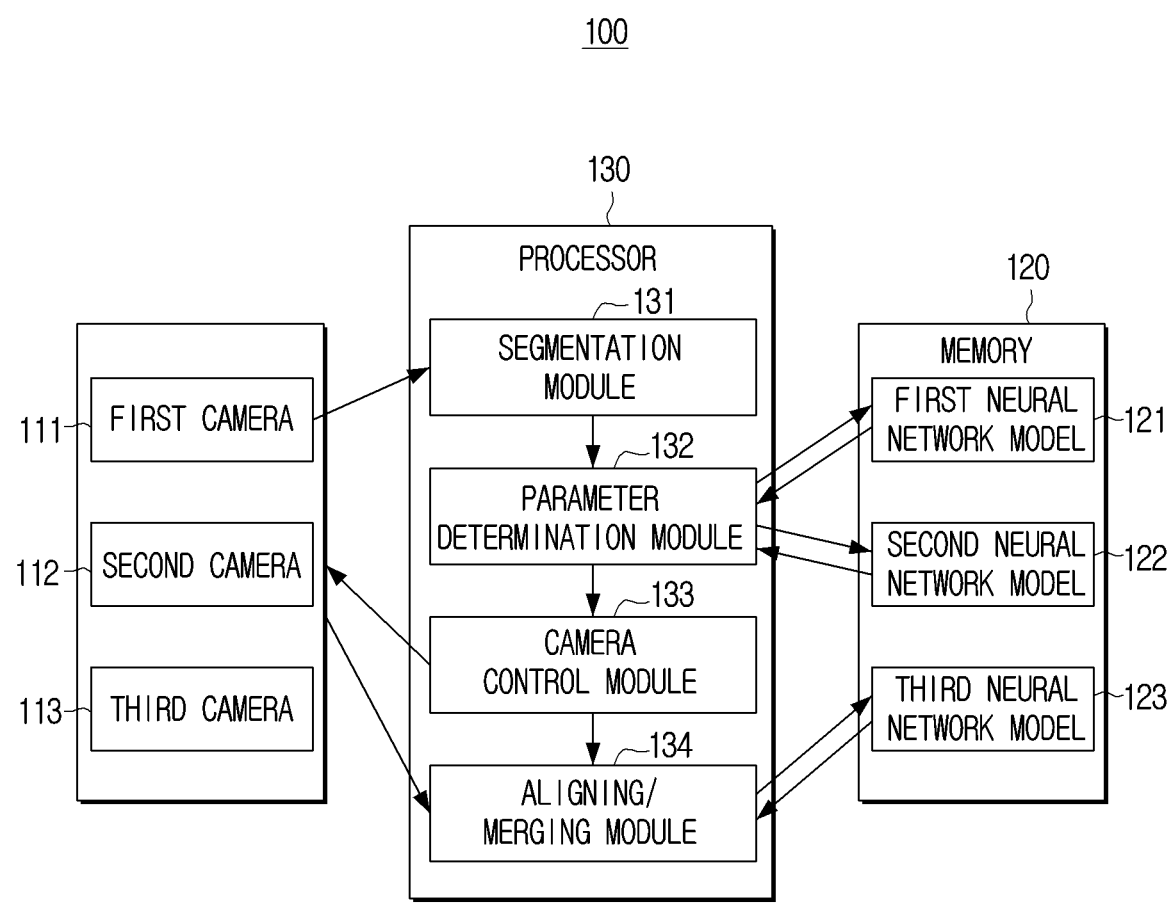
FIG. 16 is a block diagram illustrating a configuration of an electronic device according to an embodiment.

FIG. 16 is a block diagram illustrating a configuration of the electronic device according to an embodiment.

Referring to FIG. 16, the electronic device 100 may include the plurality of cameras 111, 112, and 113, a memory 120, and a processor 130.

Each of the plurality of cameras 111, 112, and 113 may obtain at least one image frame.

Specifically, each of the plurality of cameras 111, 112, and 113 may include an image sensor and a lens.

In this case, the plurality of lenses of the plurality of cameras 111, 112, and 113 may have different angles of view. For example, the plurality of lenses may include a telephoto lens, a wide angle lens, and a super wide angle lens. However, according to the disclosure, the number of lenses and the type thereof are not particularly limited, and in an example, the camera may include a standard lens.

Here, the telephoto lens has an angle of view wider than an extreme telephoto lens, the standard lens has an angle of view wider than the telephoto lens, the wide angle lens has an angle of view wider than the standard lens, and the super wide angle lens has an angle of view wider than the wide angle lens. For example, the angle of view of the extreme telephoto lens is 3 degrees to 6 degrees, the angle of view of the telephoto lens is 8 degrees to 28 degrees, the angle of view of the standard lens is 47 degrees, the angle of view of the wide angle lens is 63 degrees to 84 degrees, and the angle of view of the super wide angle lens is 94 degrees to 114 degrees.

The memory 120 may store at least one instruction regarding the electronic device 100. The memory 120 may store an operating system (O/S) for driving the electronic device 100. In addition, the memory 120 may store various software programs or applications for driving the electronic device 100 according to the various embodiments of the disclosure. The memory 120 may include a volatile memory such as a frame buffer, a semiconductor memory such as a flash memory, or a magnetic storage medium such as a hard disk drive.

Specifically, the memory 120 may store various software modules for driving the electronic device 100 according to the various embodiments of the disclosure, and the processor 130 may control the operation of the electronic device 100 by executing the various software modules stored in the memory 120. In other words, the memory 120 may be accessed by the processor 130 and reading, recording, editing, deleting, and/or updating of the data in the memory 120 by the processor 130 may be executed.

A term "memory" in the disclosure (e.g., the memory 120) may include a read only memory (ROM) (not illustrated) and a random access memory (RAM) (not illustrated) in the processor 130, or a memory card (not illustrated) (e.g., micro secure digital (SD) card or memory stick) mounted on the electronic device 100.

The processor 130 may control general operations of the electronic device 100. Specifically, the processor 130 may be connected to the elements of the electronic device 100 including the plurality of cameras 111, 112, and 113 and the memory 120 as described above, and may generally control the operations of the electronic device 100 by executing at least one instruction stored in the memory 120 described above.

In particular, the processor 130 may include at least one processor 130. For example, the processor 130 may include an image signal processor, an image processor, and an application processor (AP). Depending on embodiments, at least one of the image signal processor or the image processor may be included in an AP.

In addition, in various embodiments according to the disclosure, based on the first user command for obtaining the live view image being received, the processor 130 may obtain a plurality of regions by segmenting an image frame obtained through the camera 111 among the plurality of cameras 111, 112, and 113 based on a brightness of pixels and an object included in the image frame, obtain a plurality of camera parameter setting value sets including a plurality of parameter values with respect to the plurality of segmented regions, and based on the second user command for capturing the live view image being received, the processor 130 may obtain a plurality of image frames using the plurality of camera parameter setting value sets and the camera of the plurality of cameras 111, 112, and 113, and obtain an image frame corresponding to the second user command by merging the plurality of image frames.

Specifically, referring to FIG. 16, the processor 130 may load and use first to third neural network models 121, 122, and 123 stored in the memory 120, and may include a segmentation module 131, a parameter determination module 132, a camera control module 133, and an aligning/merging module 134.

The various embodiments of the disclosure based on the control of the processor 130 have been described above in detail with reference to FIGS. 1 to 15, and therefore the overlapped description will not be repeated.

The segmentation module 131 may obtain a plurality of regions by segmenting an image frame obtained through one camera of the plurality of cameras based on brightness of pixels and objects included in the image frame.

The parameter determination module 132 may obtain a plurality of camera parameter setting value sets each including a plurality of parameter values based on the plurality of regions.

Specifically, the parameter determination module 132 may obtain a plurality of first camera parameter setting value sets by inputting the plurality of regions to the first neural network model 121, and obtain a plurality of camera parameter setting value sets by inputting the plurality of first camera parameter setting value sets, the image frame obtained through the camera 111, and the plurality of parameter values of the camera 111 to the second neural network model 122.

The first neural network model 121 may be a neural network model trained based on the region obtained from the image frame, the plurality of parameter values of the camera which has obtained the image frame, the edge index, the contrast index, and the background index of the region.

In addition, based on the camera parameter setting value set, the image frame obtained through the camera 111, and the plurality of parameter values of the camera 111 being input, the second neural network model 122 may output information regarding the edge index, the contrast index, and the background index of the input image frame corresponding to the input camera parameter setting value set.

The first neural network model 121 may refer to a camera calibration network and the second neural network model 122 may refer to an ensemble parameter network.

The parameter determination module 132 may obtain a camera parameter setting value set with a maximum edge index, a camera parameter setting value set with a maximum contrast index, and a camera parameter setting value set with a maximum background index among the plurality of first camera parameter setting value sets, based on the information regarding the edge index, the contrast index, and the background index obtained from the second neural network model 122.

In the example described above, it is described that the plurality of camera parameter setting value sets are obtained using the neural network model, but there is no limitation thereto, and the parameter determination module 132 may identify pixel values of pixels included in each of the plurality of regions, and obtain a plurality of camera parameter setting value sets based on the identified pixel values and the predefined rule.

Based on the second user command for capturing the live view image being received, the camera control module 133 may obtain a plurality of image frames by using the plurality of camera parameter setting value sets (e.g., camera parameter setting value set with a maximum edge index, camera parameter setting value set with a maximum contrast index, and camera parameter setting value set with a maximum background index) obtained by the parameter determination module 132 and at least two cameras of the plurality of cameras 111, 112, and 113.

In an example, based on the second user command for capturing the live view image being received, the camera control module 133 may obtain a plurality of image frames using the plurality of camera parameter setting value sets and the plurality of cameras 111, 112, and 113.

In another example, based on the second user command for capturing the live view image being received, the camera control module 133 may obtain a plurality of image frames by obtaining an image frame using one camera parameter setting value set among the plurality of camera parameter setting value sets and a first camera among the plurality of cameras 111, 112, and 113, and obtaining at least two image frames using at least two camera parameter setting value sets among the plurality of camera parameter setting value sets and a second camera among the plurality of cameras 111, 112, and 113.

In still another example, based on the second user command for capturing the live view image being received, the camera control module 133 may obtain a plurality of image frames using the plurality of camera parameter setting value sets and one camera of the plurality of cameras 111, 112, and 113.

As described above, the camera control module 133 may obtain a plurality of image frames. Each of the plurality of image frames may be a Bayer raw image.

The aligning/merging module 134 may obtain an image frame corresponding to the second user command by merging the plurality of obtained image frames and inputting the merged image frame to the third neural network model 123.

In this case, the image frame obtained from the third neural network model 123 may be an image frame subjected to at least one of black level adjustment, color correction, gamma correction, or edge enhancement.

As described above, according to various embodiments of the disclosure, the processor 130 may obtain the image frame. In this case, the processor 130 may store the obtained image frame in the memory 120, specifically, a flash memory.

According to an embodiment of the disclosure, the operation of the parameter determination module 132 for obtaining the plurality of camera parameter setting value sets may be performed by an image processor, and the operation of the aligning/merging module 134 for obtaining the image frame corresponding to the user command for capturing using the plurality of image frames may be performed by an image signal processor.

Figure 17:
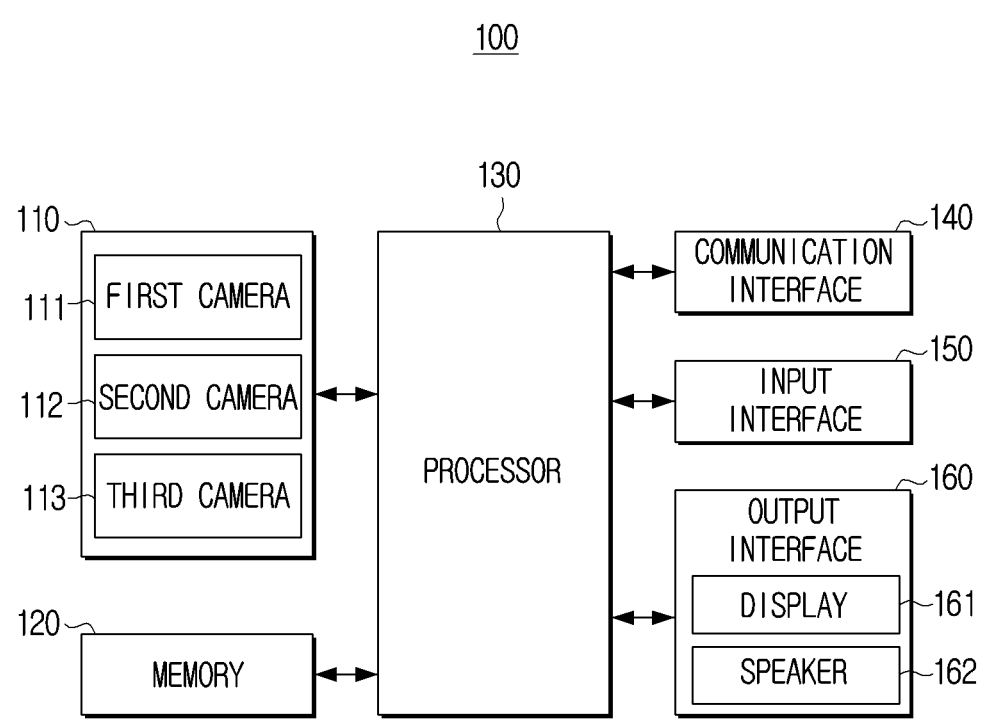
FIG. 17 is a block diagram more specifically illustrating a configuration of an electronic device according to an embodiment.

FIG. 17 is a block diagram more specifically illustrating a hardware configuration of the electronic device according to an embodiment.

Referring to FIG. 17, the electronic device 100 according to the disclosure may further include a communication interface 140, an input interface 150, and an output interface 160, in addition to the plurality of cameras 111, 112, and 113, the memory 120, and the processor 130. However, such configuration is merely an example, and an additional element may be added to the above configuration or a part of the elements in the above configuration may be omitted.

The communication interface 140 may include circuitry and perform communication with an external device. Specifically, the processor 130 may receive various data or information from an external device connected via the communication interface 140 and transmit the various data or information to the external device.

The communication interface 140 may include at least one of a Wi-Fi module, a Bluetooth module, a wireless communication module, and a near field communication (NFC) module. Specifically, the Wi-Fi module and the Bluetooth module may perform communication by using Wi-Fi™ and Bluetooth™ protocols, respectively. In a case of using the Wi-Fi module and the Bluetooth module, various pieces of connection information such as service set identifier (SSID) may be transmitted or received first to allow the communication connection via Wi-Fi™ and Bluetooth™, and then various pieces of information may be transmitted and received.

The wireless communication module may perform communication according to various communication standards such as IEEE, Zigbee™, 3rd Generation (3G), 3rd Generation Partnership Project (3GPP), Long Term Evolution (LTE), and 5th generation (5G). The NFC module may perform communication by a near field communication (NFC) method using 13.56 MHz band among various radio frequency identification (RFID) frequency bands of 135 kHz, 13.56 MHz, 433 MHz, 860 to 960 MHz, 2.45 GHz, and the like.

In particular, according to an embodiment of the disclosure, when the electronic device 100 downloads the neural network model from the external device, the communication interface 140 may receive first to third neural network models 121, 122, and 123 from the external device.

The input interface 150 may include circuitry, and the processor 130 may receive a user command for controlling the operation of the electronic device 100 via the input interface 150. Specifically, the input interface 150 may be configured with a configuration such as a microphone and a remote signal receiver (not illustrated), and implemented as being included in a display 161 as a touch screen.

In particular, in the various embodiments according to the disclosure, the input interface 150 may receive the first user command for obtaining the live view image and the second user command for capturing the live view image.

The output interface 160 may include circuitry and the processor 130 may output various functions that may be performed by the electronic device 100 via the output interface 160. The output interface 160 may include the display 161 and a speaker 162. For example, the display 161 may be implemented as a liquid crystal display (LCD) panel or an organic light emitting diode (OLED), and the display 161 may also be implemented as a flexible display or a transparent display. However, the display 161 according to the disclosure is not limited to a specific type. In particular, in the various embodiments according to the disclosure, the display 161 may display a live view image. In addition, the display 161 may display an image frame stored in the memory 120 according to a user command.

The speaker 162 may output a sound. Specifically, the processor 130 may output various alerts or voice guidance messages related to the operation of the electronic device 100 via the speaker 162.

Figure 18A:
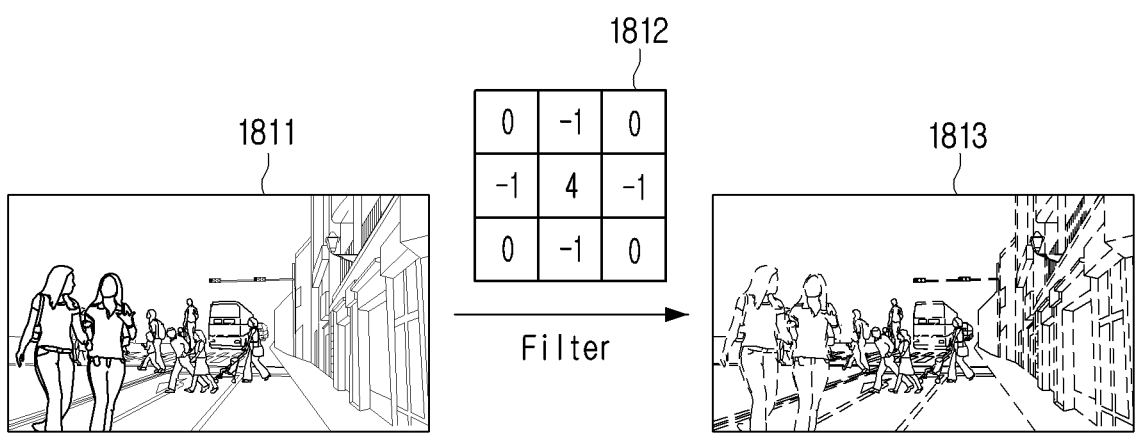
FIG. 18A is a diagram illustrating an example of a method for calculating an image index according to an embodiment.
Figure 18B:
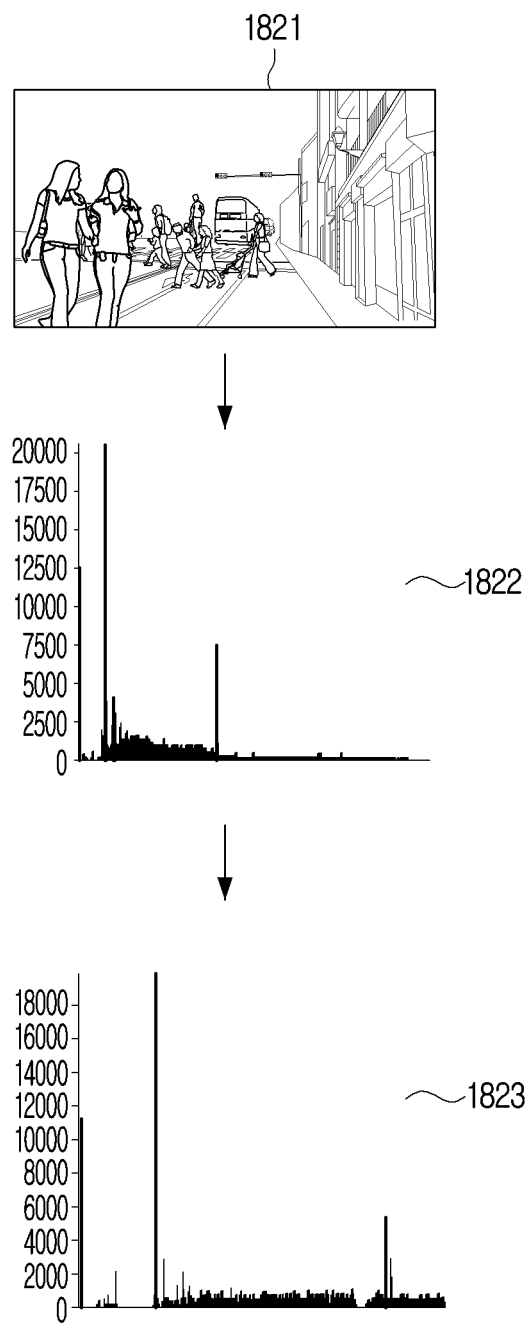
FIG. 18B is a diagram illustrating an example of a method for calculating an image index according to an embodiment.
Figure 18C:
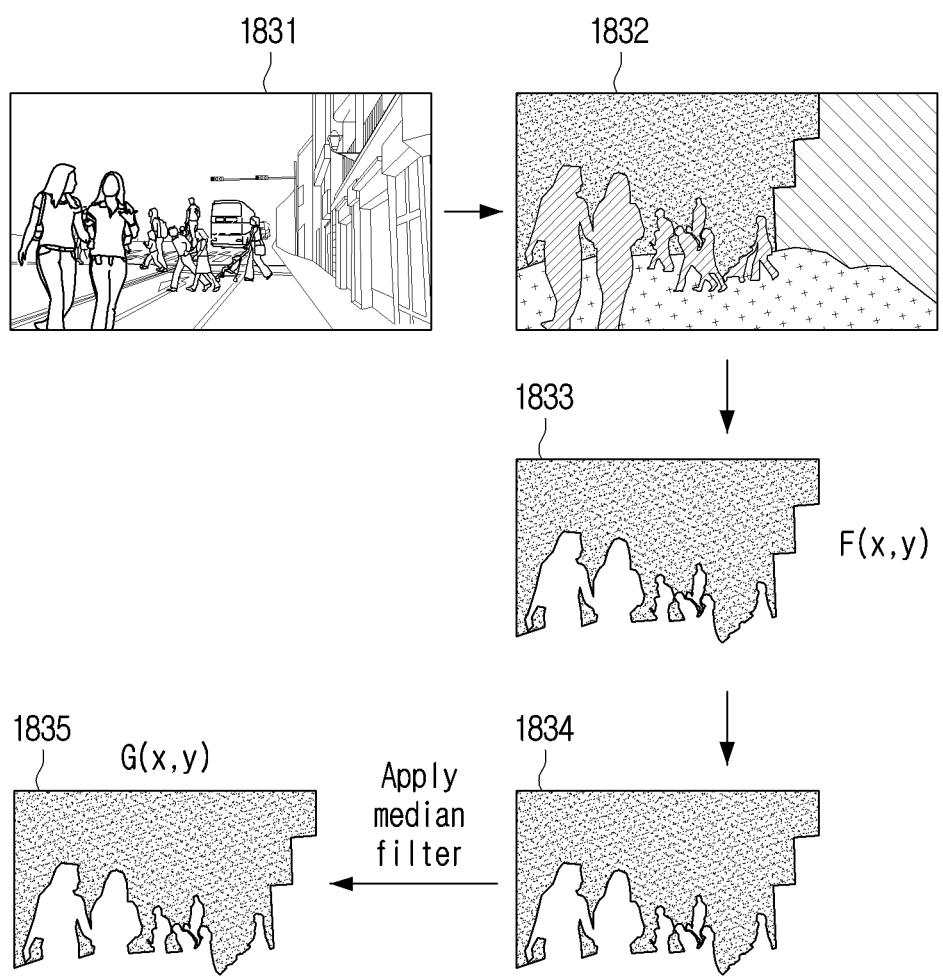
FIG. 18C is a diagram illustrating an example of a method for calculating an image index according to an embodiment.

FIGS. 18A, 18B, and 18C are diagrams illustrating examples of methods for calculating image indexes according to embodiments.

FIG. 18A is a diagram illustrating a method for calculating an edge index.

Specifically, a filter may be applied to an image frame, and a breadth (or a width), a height (or a length) of the image frame, and a pixel value of each pixel included in the image frame may be obtained after applying the filter. An edge index may be determined based on the obtained width, height, and pixel value of the image.

For example, referring to FIG. 18A, a Laplacian filter having a mask 1812 is applied to an image frame 1811, and an image frame 1813 with enhanced edge may be obtained. The edge index may be calculated by applying the width, the height, and the pixel value of the image frame 1813 to Mathematical Expression 5 below.

$$\text{Edge Index} = \frac{\sum_{0}^{m}\sum_{0}^{n} F(x,y)}{m \cdot n} \qquad \text{[Mathematical Expression 5]}$$

Herein, m represents a width of an image frame (that is, number of pixels in a width direction), n represents a height of an image frame (that is, number of pixels in a height direction), and F(x,y) represents a pixel value of a pixel having a coordinate value (x,y) in the image frame.

FIG. 18B is a diagram illustrating a method for calculating a contrast index.

For example, referring to FIG. 18B, a histogram 1822 of an image frame 1821 may be generated. Here, the histogram 1822 shows pixels included in the image frame 1821 which are classified by pixel values, and may represent a number of pixels having corresponding pixel value for each pixel value.

In addition, an equalized histogram 1823 may be generated by performing equalization with respect to the histogram 1822.

Referring to Mathematical Expression 6, a deviation between the histogram 1822 and the equalized histogram 1823 may be calculated to calculate a contrast index.

$$\text{Contrast Index} = \sum_{0}^{m}\sum_{0}^{n} (H(x)\cdot x - H(y)\cdot y)/N \qquad \text{[Mathematical Expression 6]}$$

Herein, m represents a width of an image frame (that is, number of pixels in a width direction), n represents a height of an image frame (that is, number of pixels in a height direction), H(x) represents a number of pixels of which a pixel value calculated from the histogram is x, H(y) represents a number of pixels of which a pixel value calculated from the equalized histogram is y, and N represents a number of pixels included in the image frame.

FIG. 18C is a diagram illustrating a method for calculating a background index.

Regarding the background index, a filter may be applied to an image frame, a width and a height of the image frame may be obtained after applying the filter, and a background index may be determined based on the obtained width and height.

For example, referring to FIG. 18C, an image frame 1831 may be segmented into a plurality of regions as shown in 1832, and one region F(x,y) 1833 (e.g., region corresponding to background) among these regions may be selected. Random pixels may be selected from the selected region 1833, pixel values of the selected pixels may be set to 0 or 255 randomly, and salt and pepper noise may be added to the selected region 1833. Then, a median filter with a kernel size of 5 may be applied to a region 1834 to which the salt and pepper noise is applied, and a region G(x,y) 1835, to which the median filter is applied, may be generated.

The background index may be calculated based on Mathematical Expression 7 below.

$$\text{Noise Index of segment} = \frac{\sum_{0}^{m}\sum_{0}^{n} F(x,y) - G(x,y)}{m \cdot n} \qquad \text{[Mathematical Expression 7]}$$

Herein, F(x,y) represents a pixel value of a pixel having a coordinate value (x,y) in the region 1833, G(x,y) represents a pixel value of a pixel having a coordinate value (x,y) in the region 1835, m represents a width of an image frame (that is, number of pixels in a width direction), and n represents a height of an image frame (that is, number of pixels in a height direction).

FIGS. 18A to 18C are merely an example of a method for calculating the image indexes, and there is no limitation thereto, and the image indexes may be calculated through various known methods.

In addition, it is described with reference to FIGS. 18A to 18C that the image indexes of the image frame are calculated, but the image indexes regarding the region of the image frame may also be calculated through the methods described above.

Figure 19:
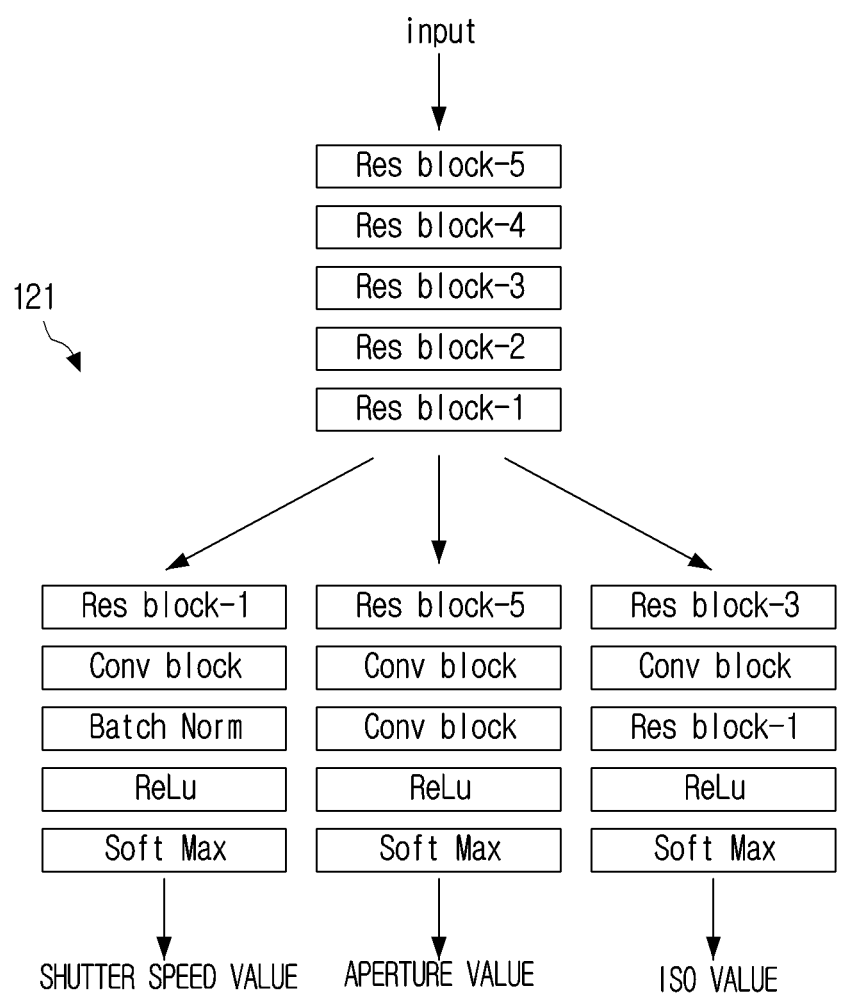
FIG. 19 is a diagram illustrating a structure of a first neural network model according to an embodiment.

FIG. 19 is a diagram illustrating a structure of the first neural network model according to an embodiment.

Referring to FIG. 19, the first neural network model 121 may receive a region as an input and output a camera parameter setting value set corresponding to the region. In this case, the camera parameter setting value set may include the ISO value, the shutter speed value, and the aperture value.

In a case of the first neural network model 121, there is a common part (e.g., residual blocks (Res blocks)). As described above, the first neural network model 121 is designed with a shared feature concept in that features used in one model may be used for another model, and accordingly, an amount of calculation may be relatively reduced.

In addition, final layers of the first neural network model 121 were designed in consideration of final estimation parameters, that is, ISO value, shutter speed value, and aperture value.

Specifically, in a case of an ISO, an effect due to a color of an image is more significant than a shape, and accordingly, one convolution block was used. In addition, in a case of the aperture, the shape and the edge are considered to be important. Accordingly, two convolution blocks were used for the aperture. In a case of the shutter speed, it is required to distinguish the edge and features at high level, and accordingly the residual block was used. The residual block is effective to maintain most part of the input image while leaning a new feature, and the convolution block is effective to learn a filter for reducing input calculation.

In the disclosure, the residual block and the convolution block may have relationships of (a) and (b) of FIG. 20.

Figure 21:
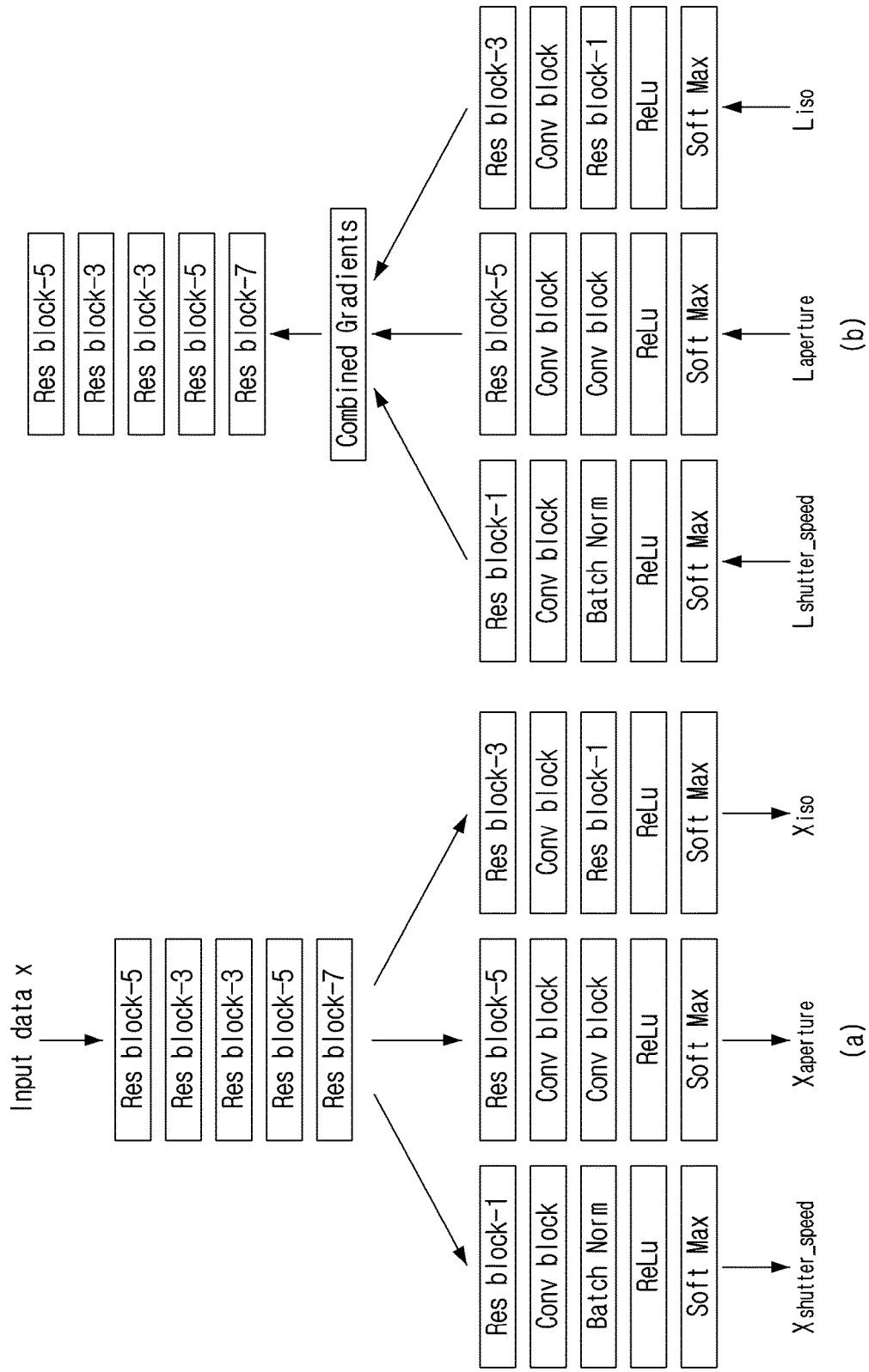
FIG. 21 is a diagram illustrating training of a first neural network model according to an embodiment.

Hereinafter, referring to FIG. 21, the training of the first neural network model 121 will be described simply.

Referring to (a) of FIG. 21, the forward pass leaning of the first neural network model 121 is as below.

The input data x is input to the first neural network model 121 to obtain an $x_{iso}$ value, an $x_{shutter\_speed}$ value, and an $x_{aperture}$ value from the first neural network model 121.

Then, a loss between the data obtained from the first neural network model 121 and the output data y may be calculated. Specifically, a loss $L_{iso}$ between ($x_{iso}$, $y_{iso}$), a loss $L_{shutter\_speed}$ between ($x_{shutter\_speed}$, $y_{shutter\_speed}$), and a loss $L_{aperture}$ between ($x_{aperture}$, $y_{aperture}$) may be calculated based on Mathematic Expression 8. The output data y may satisfy $y_{iso} = r \times Y_{captured\_iso}$, $y_{shutter\_speed} = r \times Y_{captured\_shutter\_speed}$, and $y_{aperture} = r \times Y_{captured\_aperture}$. Herein, $Y_{captured\_iso}$, $Y_{captured\_shutter\_speed}$, and $Y_{captured\_aperture}$ are respectively an ISO value, a shutter speed value, and an aperture value used for obtaining the input data x. In addition, $r = (e_i + b_i + c_i)/3$. Here, $e_i$ represents an edge index of the input data x, $b_i$ represents a background index of the input data x, and $c_i$ represents a contrast index of the input data x.

$$L(x, y) = \frac{\lambda_1 |x - y|^2}{2} + \lambda_2 \ln(\cosh(x - y))$$ [Mathematical Expression 8]

Referring to (b) of FIG. 21, backward pass learning of the first neural network model 121 is performed as below.

Specifically, a weight of each layer may be updated as $$W_{new} = W_{old} - n \cdot \frac{\partial L}{\partial \omega}$$

through a gradient descent using the loss $L_{iso}$, $L_{shutter\_speed}$, and $L_{aperture}$. A combined gradient may be calculated using an average of gradients before backpropagation passes through the common part, and the backpropagation is proceeded based thereon, thereby updating weight.

The structure and the training method of the first neural network model 121 are merely an example, and the first neural network model 121 with various structures may be trained through various methods.

FIG. 22 is a diagram illustrating a structure of the second neural network model according to an embodiment.

Based on a camera parameter setting value set (x,y,z), an image frame, and a plurality of parameter values ($x_0, y_0, z_0$) of the camera which has obtained the image frame being input, the second neural network model 122 may output information regarding an edge index Ei, a contrast index Ci, and a background index Bi of the image frame corresponding to the input camera parameter setting value set. In this case, the second neural network model 122 may estimate the edge index, the contrast index, and the background index using dense modules of the parameter estimation network model and output these.

Each block of the second neural network model 122 illustrated in (a) of FIG. 22 may have the configuration as illustrated in (b) of FIG. 22.

The structure of the second neural network model 122 described above is merely an example, and the second neural network model 122 may have various structures.

Figure 23A:
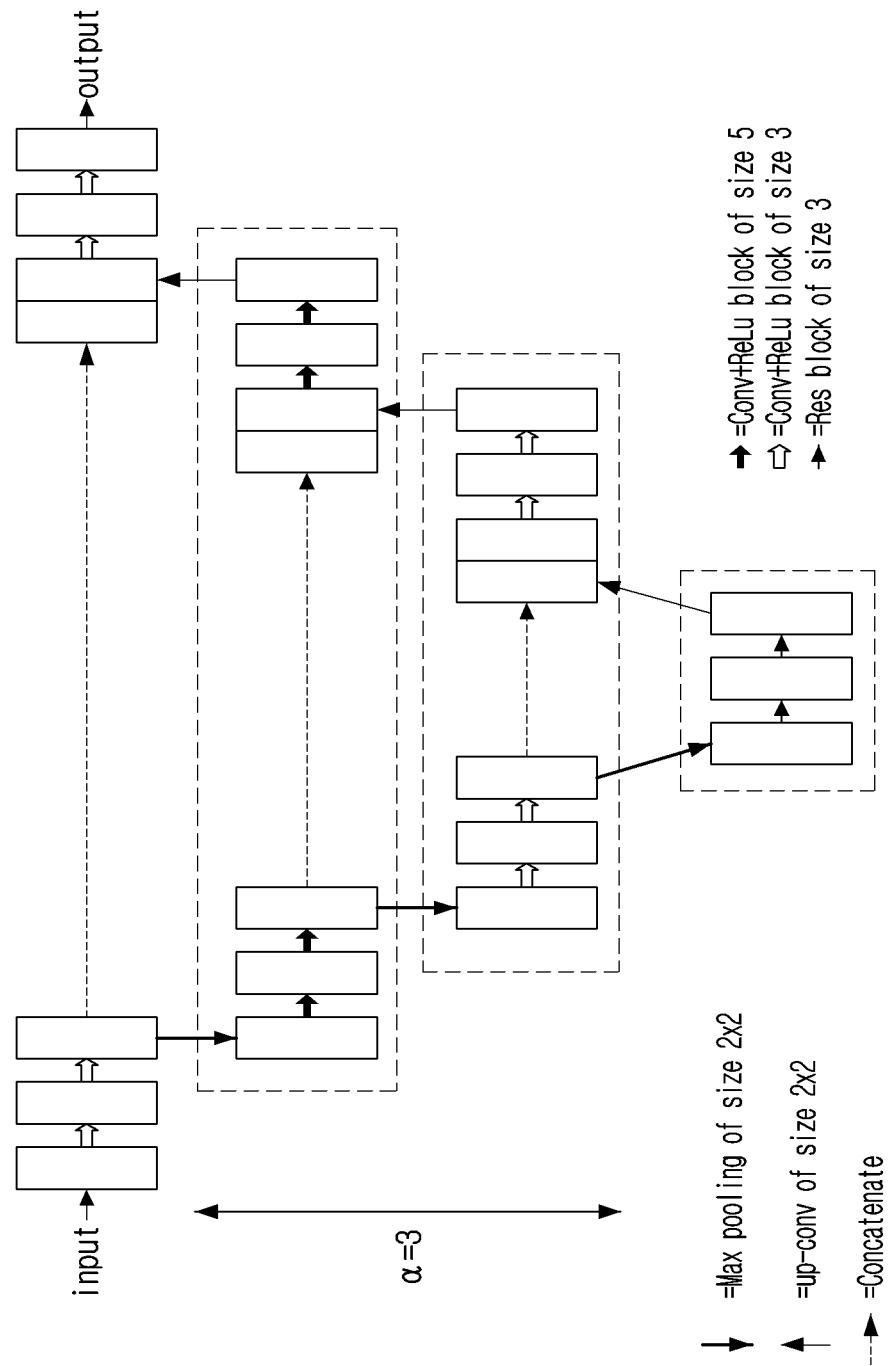
FIG. 23A is a diagram illustrating a structure of a third neural network model according to an embodiment.
Figure 23B:
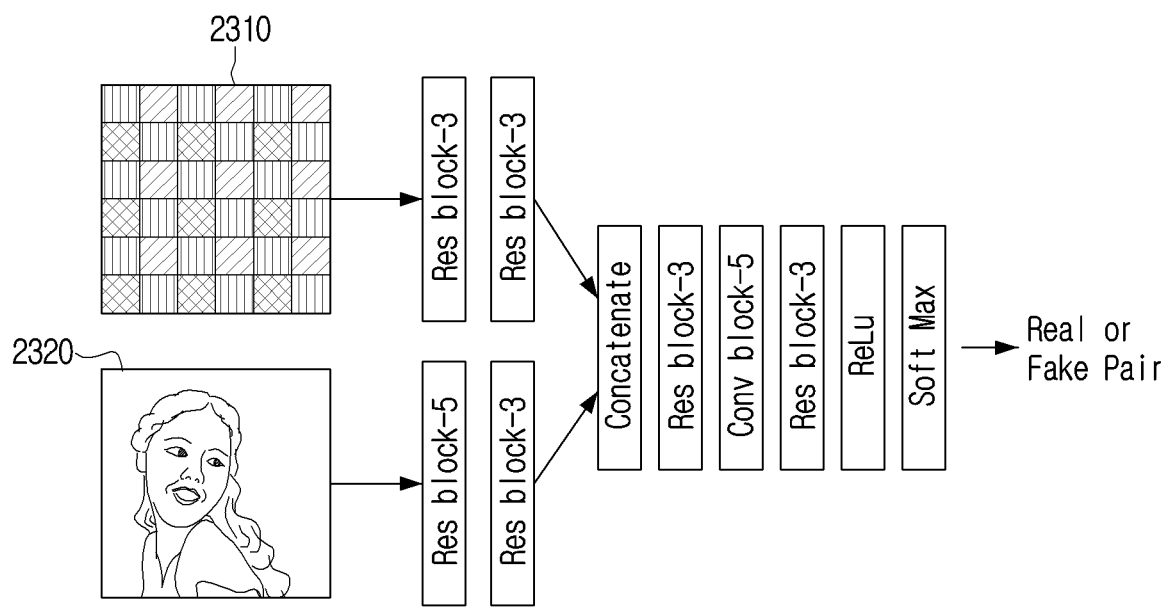
FIG. 23B is a diagram illustrating a structure of a third neural network model according to an embodiment.

FIGS. 23A and 23B are diagrams illustrating a structure of the third neural network model according to an embodiment.

First, FIG. 23A illustrates a structure of a generator of the third neural network model 123.

Referring to FIG. 23A, based on the merged image frame being input, the generator may output the image frame (that is, image frame in which each of a plurality of pixels has R, G, and B pixel values). In this case, adaptive GaN may be used for realistic feature of the image frame ensured by adversarial loss term.

In addition, the generator may have a U-net structure in order to compensate the loss of information occurred during the downsampling of the plurality of layers. The number α of downsampling layers is merely an example, and may be 3. In this case, the generator may perform a filtering operation through each layer having the U-net structure, and perform at least one of black level adjustment, color correction, gamma correction, or edge enhancement of the image frame.

FIG. 23B illustrates a structure of the discriminator of the third neural network model 123.

Referring to FIG. 23B, the discriminator may receive input data 2310 and 2320 and output a probability value indicating whether the input data is real or fake. The input data 2310 and 2320 may be real pair data or fake pair data.

In other words, the discriminator may operate as an image classifier for classifying the input data as real or fake data.

For this, the residual blocks of the discriminator may convert the Bayer raw image and the RGB format image frame to a common format with the same number of channels. The data in the same format may be concatenated, and residual block and convolution block in the final layers may obtain salient features for final labelling.

The structure of the third neural network model 123 described above is merely an example, and the third neural network model 123 may have various structures.

The function related to the neural network model as described above may be performed through the memory and the processor. The processor may include one or a plurality of processors. The one or the plurality of processors may be a general-purpose processor such as a CPU or an AP, a graphic dedicated processor such as a GPU or a visual processing unit (VPU), or an artificial intelligence dedicated processor such as a neural processing unit (NPU), or the like. The one or the plurality of processors may perform control to process the input data according to a predefined action rule stored in a non-volatile memory and a volatile memory or an artificial intelligence model. The predefined action rule or the artificial intelligence model is formed through training.

Being formed through training herein may, for example, imply that a predefined action rule or an artificial intelligence model with a desired feature is formed by applying a learning algorithm to a plurality of pieces of learning data. Such training may be performed in a device demonstrating artificial intelligence according to the disclosure or performed by a separate server and/or system.

The artificial intelligence model may include a plurality of neural network layers. Each layer has a plurality of weight values, and executes processing of layer through a processing result of a previous layer and processing between the plurality of weights. Examples of the neural network include Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and Deep Q-Networks, and the neural network of the disclosure is not limited to the above examples, unless otherwise noted.

The learning algorithm may be a method for training a predetermined target machine (e.g., robot) using a plurality of learning data to enable the predetermined target machine to determine or predict by itself. Examples of the learning algorithm include supervised learning, unsupervised learning, semi-supervised learning, or reinforcement learning, but the learning algorithm in the disclosure is not limited to these examples, unless otherwise noted.

The machine-readable storage medium may be provided in a form of a non-transitory storage medium. Here, the "non-transitory" storage medium is tangible and may not include signals only, and it does not distinguish whether data is semi-permanently or temporarily stored in the storage medium. For example, the "non-transitory storage medium" may include a buffer temporarily storing data.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloading or uploading) through an application store (e.g., PlayStore™) or directly between two user devices (e.g., smartphones). In a case of the on-line distribution, at least a part of the computer program product may be at least temporarily stored or temporarily generated in a machine-readable storage medium such as a memory of a server of a manufacturer, a server of an application store, or a relay server.

Each of the elements (e.g., a module or a program) according to various embodiments of the disclosure described above may include a single entity or a plurality of entities, and some sub-elements of the abovementioned sub-elements may be omitted or other sub-elements may be further included in various embodiments. Alternatively or additionally, some elements (e.g., modules or programs) may be integrated into one entity to perform the same or similar functions performed by each respective element prior to the integration.

Operations performed by a module, a program, or other elements, in accordance with various embodiments, may be performed sequentially, in a parallel, repetitive, or heuristically manner, or at least some operations may be performed in a different order, omitted, or may add a different operation.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine (e.g., computer)-readable storage media. The machine is a device which invokes instructions stored in the storage medium and is operated according to the invoked instructions, and may include an electronic device (e.g., electronic device 100) according to the disclosed embodiments.

In a case where the instruction is executed by a processor, the processor may perform a function corresponding to the instruction directly or using other elements under the control of the processor. The instruction may include a code made by a compiler or a code executable by an interpreter.

The electronic device and the method for controlling the electronic device according to the disclosure may obtain a high-quality image frame. In particular, it is possible to obtain a high-quality image frame with minimized effect of noise even in a low gradation.

The electronic device and the method for controlling the electronic device according to the disclosure may provide a user a high-quality image frame according to a user command for capturing by identifying an optimal parameter setting value set through a live view image in real time.

The electronic device and the method for controlling the electronic device according to the disclosure may generate a high-quality image frame by merging a plurality of images obtained through a plurality of cameras to which different setting value sets are applied.

In addition, in the related art, a patch phenomenon (e.g., horizontal line of sky background) easily occurs in a high-resolution image, but in the electronic device and the method for controlling the electronic device according to the disclosure, the patch phenomenon is hardly observed and an effect of reducing ghosting phenomenon is reduced, because a live view image is segmented into a plurality of regions according to a brightness and an object included in an image frame, a plurality of image frames are obtained using camera parameter setting value sets corresponding to the plurality of regions, and an image frame corresponding to a user command for capturing is generated using the plurality of image frames.

While exemplary embodiments have been described above in detail, it should be understood that various modification and changes may be made without departing from the spirit and scope of the disclosure as defined in the appended claims and their equivalents.

What is claimed is:

1. An electronic device comprising:
a plurality of cameras; and
at least one processor communicatively connected to the plurality of cameras,
wherein the at least one processor is configured to:
based on a first user command to obtain a live view image, obtain a plurality of regions by segmenting a first image frame, obtained via a first camera among the plurality of cameras, based on a brightness of pixels and an object included in the first image frame;
obtain a plurality of camera parameter setting value sets, each camera parameter setting value set including a plurality of parameter values and corresponding to each of the plurality of regions obtained by segmenting the first image frame that is obtained via the first camera;
based on a second user command to capture the live view image, obtain a plurality of image frames by applying the plurality of camera parameter setting value sets to at least one camera among the plurality of cameras; and
obtain a second image frame corresponding to the second user command by merging the plurality of image frames, and
wherein the at least one processor is further configured to:
obtain a plurality of first camera parameter setting value sets, each of which corresponds to each of the plurality of regions, by inputting the plurality of regions to a first neural network model, and
obtain the plurality of camera parameter setting value sets by inputting the plurality of first camera parameter setting value sets, the first image frame obtained via the first camera, and a plurality of parameter values of the first camera to a second neural network model.

2. The electronic device according to claim 1, wherein the first neural network model is a neural network model trained based on a region obtained from a training image frame, a plurality of parameter values of a camera which has obtained the training image frame, and an edge index, a contrast index, and a background index of the region.

3. The electronic device according to claim 1, wherein the second neural network model is configured to, based on a camera parameter setting value set, the first image frame obtained through the first camera, and the plurality of parameter values of the first camera being input, output information regarding an edge index, a contrast index, and a background index of the input first image frame corresponding to the input camera parameter setting value set, and
wherein the at least one processor is further configured to, based on the information regarding the edge index, the contrast index, and the background index obtained from the second neural network model, obtain a camera parameter setting value set corresponding to a maximum edge index, a camera parameter setting value set corresponding to a maximum contrast index, and a camera parameter setting value set corresponding to a maximum background index, among the plurality of first camera parameter setting value sets.

4. The electronic device according to claim 1, wherein the at least one processor is further configured to identify pixel values of pixels included in each of the plurality of regions, and obtain the plurality of camera parameter setting value sets based on the identified pixel values and a predefined rule.

5. The electronic device according to claim 1, wherein the at least one processor is further configured to, based on the second user command to capture the live view image, obtain an image frame by applying one camera parameter setting value set, among the plurality of camera parameter setting value sets, to a second camera among the plurality of cameras, and obtain at least two image frames by applying at least two camera parameter setting value sets, among the plurality of camera parameter setting value sets, to a third camera among the plurality of cameras.

6. The electronic device according to claim 1, wherein the at least one processor is further configured to obtain the second image frame corresponding to the second user command by inputting a merged image frame to a third neural network model.

7. The electronic device according to claim 1, wherein each of the plurality of image frames is a Bayer raw image.

8. The electronic device according to claim 6, wherein the second image frame obtained from the third neural network model has been subjected to at least one of black level adjustment, color correction, gamma correction, or edge enhancement.

9. A method for controlling an electronic device, the electronic device comprising a plurality of cameras, the method comprising:
based on a first user command to obtain a live view image, obtaining a plurality of regions by segmenting a first image frame, obtained via a first camera among the plurality of cameras, based on a brightness of pixels and an object included in the first image frame;
obtaining a plurality of camera parameter setting value sets each camera parameter setting value set including a plurality of parameter values and corresponding to each of the plurality of regions obtained by segmenting the first image frame that is obtained via the first camera;
based on a second user command to capture the live view image, obtaining a plurality of image frames by applying the plurality of camera parameter setting value sets to at least one camera among the plurality of cameras; and
obtaining a second image frame corresponding to the second user command by merging the plurality of image frames,
wherein the obtaining the plurality of camera parameter setting value sets comprises:
obtaining a plurality of first camera parameter setting value sets, each of which corresponds to each of the plurality of regions, by inputting the plurality of regions to a first neural network model; and
obtaining the plurality of camera parameter setting value sets by inputting the plurality of first camera parameter setting value sets, the first image frame obtained via the first camera, and a plurality of parameter values of the first camera to a second neural network model.

10. The method according to claim 9, wherein the first neural network model is a neural network model trained based on a region obtained from a training image frame, a plurality of parameter values of a camera which has obtained the training image frame, and an edge index, a contrast index, and a background index of the region.

11. The method according to claim 9, wherein the second neural network model is configured to, based on a camera parameter setting value set, the first image frame obtained through the first camera, and the plurality of parameter values of the first camera being input, output information regarding an edge index, a contrast index, and a background index of the input first image frame corresponding to the input camera parameter setting value set, and wherein the obtaining the plurality of camera parameter setting value sets comprises obtaining, based on the information regarding the edge index, the contrast index, and the background index obtained from the second neural network model, a camera parameter setting value set corresponding to a maximum edge index, a camera parameter setting value set corresponding to a maximum contrast index, and a camera parameter setting value set corresponding to a maximum background index, among the plurality of first camera parameter setting value sets.

12. The method according to claim 9, wherein the obtaining the plurality of camera parameter setting value sets comprises identifying pixel values of pixels included in each of the plurality of regions, and obtaining the plurality of camera parameter setting value sets based on the identified pixel values and a predefined rule.

13. The method according to claim 9, wherein the obtaining the plurality of image frames comprises, based on the second user command to capture the live view image, obtaining the plurality of image frames by obtaining an image frame by applying one camera parameter setting value set, among the plurality of camera parameter setting value sets, to a second camera among the plurality of cameras, and obtaining at least two image frames by applying at least two camera parameter setting value sets, among the plurality of camera parameter setting value sets, to a third camera among the plurality of cameras.

14. The method according to claim 9, wherein the obtaining the second image frame comprises obtaining the second image frame corresponding to the second user command by inputting a merged image frame to a third neural network model.

15. The method according to claim 14, wherein each of the plurality of image frames is a Bayer raw image.

16. The method according to claim 14, wherein the second image frame obtained from the third neural network model has been subjected to at least one of black level adjustment, color correction, gamma correction, or edge enhancement.

17. The electronic device according to claim 1, wherein the plurality of parameter values included in each camera parameter setting value set includes an International Organization for Standardization (ISO) value, a shutter speed, and an aperture, and wherein an aperture of the at least one camera, to which the plurality of camera parameter setting value sets are applied, has a size that is equal to the aperture included in the plurality of camera parameter setting value sets.

18. A non-transitory computer-readable storage medium storing program code, the program code being executable by at least one processor to cause the at least one processor to control an electronic device comprising a plurality of cameras, by performing:

based on a first user command to obtain a live view image, obtaining a plurality of regions by segmenting a first image frame, obtained via a first camera among the plurality of cameras, based on a brightness of pixels and an object included in the first image frame;

obtaining a plurality of camera parameter setting value sets each camera parameter setting value set including a plurality of parameter values and corresponding to each of the plurality of regions obtained by segmenting the first image frame that is obtained via the first camera;

based on a second user command to capture the live view image, obtaining a plurality of image frames by applying the plurality of camera parameter setting value sets to at least one camera among the plurality of cameras; and obtaining a second image frame corresponding to the second user command by merging the plurality of image frames wherein the obtaining the plurality of camera parameter setting value sets comprises:

obtaining a plurality of first camera parameter setting value sets, each of which corresponds to each of the plurality of regions, by inputting the plurality of regions to a first neural network model; and obtaining the plurality of camera parameter setting value sets by inputting the plurality of first camera parameter setting value sets, the first image frame obtained via the first camera, and a plurality of parameter values of the first camera to a second neural network model.

* * * * *